(12) United States Patent
Lockhart et al.

(10) Patent No.: US 8,327,887 B2
(45) Date of Patent: Dec. 11, 2012

(54) HOSE

(75) Inventors: Mark Lockhart, Waterford, PA (US); Josef Schomaker, Edinboro, PA (US)

(73) Assignee: All-American Hose LLC, Union City, PA (US)

( * ) Notice: Subject to any disclaimer, the term of this patent is extended or adjusted under 35 U.S.C. 154(b) by 867 days.

(21) Appl. No.: 12/323,624

(22) Filed: Nov. 26, 2008

(65) Prior Publication Data
US 2010/0102552 A1 Apr. 29, 2010

(51) Int. Cl.
*F16L 11/00* (2006.01)
(52) U.S. Cl. .......................... 138/125; 138/127; 138/146
(58) Field of Classification Search .................. 138/125, 138/127, 146
See application file for complete search history.

(56) References Cited

U.S. PATENT DOCUMENTS

| | | | |
|---|---|---|---|
| 3,073,628 A | 1/1963 | Cline et al. | |
| 3,332,447 A | 7/1967 | Holmgren | |
| 3,457,359 A | 7/1969 | Soucy | |
| 3,687,491 A | 8/1972 | Marshall | |
| 4,135,025 A * | 1/1979 | Backes | 428/195.1 |
| 4,380,252 A * | 4/1983 | Gray et al. | 138/125 |
| 4,394,705 A * | 7/1983 | Blachman | 361/215 |
| 4,467,837 A | 8/1984 | Baker | |
| 4,486,036 A | 12/1984 | Storke et al. | |
| 4,564,222 A | 1/1986 | Loker et al. | |
| 4,593,942 A | 6/1986 | Loker | |
| 4,877,665 A * | 10/1989 | Higuchi et al. | 428/36.1 |
| 4,940,261 A | 7/1990 | Somers Vine | |
| 4,952,262 A | 8/1990 | Washkewicz et al. | |
| 5,164,237 A * | 11/1992 | Kaneda et al. | 428/34.7 |
| 5,297,822 A | 3/1994 | Sanders et al. | |
| 5,413,147 A | 5/1995 | Moreiras et al. | |
| 5,593,527 A | 1/1997 | Schomaker et al. | |
| 5,603,357 A | 2/1997 | Schomaker et al. | |
| 5,971,007 A | 10/1999 | Harcourt et al. | |
| 6,102,450 A | 8/2000 | Harcourt | |
| 6,112,771 A * | 9/2000 | Aoyagi et al. | 138/127 |
| 6,508,276 B2 * | 1/2003 | Radlinger et al. | 138/125 |
| 6,581,977 B1 | 6/2003 | Dole et al. | |
| 6,659,510 B1 | 12/2003 | Ikegami et al. | |

(Continued)

FOREIGN PATENT DOCUMENTS

GB 1057623 8/1962

(Continued)

OTHER PUBLICATIONS

WWW.VICTAULIC.COM, Pages From, Jul. 22, 2008.

(Continued)

*Primary Examiner* — James Hook
(74) *Attorney, Agent, or Firm* — Woodling, Krost and Rust

(57) ABSTRACT

The hose includes an outer jacket which includes warp and weft fibers made of Vectran®. The process for making the hose, includes: forming an inner liner and coating the exterior thereof with adhesive; weaving, in a twill weave pattern, Vectran® yarn, in a repeating 2-4-2-4-2 pattern in both the warp and the weft directions; extruding polyurethane onto the woven vectran yarn, the polyurethane extending into pillars between the warp and weft yarn, forming an outer liner; inserting the inner liner coated with adhesive within the outer liner; and, pressurizing the inner liner with steam expanding the inner liner and the adhesive into engagement with the Vectran® yarn and polyurethane pillars of the outer liner.

15 Claims, 23 Drawing Sheets

U.S. PATENT DOCUMENTS

| | | | |
|---|---|---|---|
| 6,978,805 B2 | 12/2005 | D'Amico | |
| 6,984,351 B2 | 1/2006 | Harcourt et al. | |
| 7,198,476 B2 | 4/2007 | Harcourt et al. | |
| 7,794,813 B2 * | 9/2010 | Nguyen et al. | 428/60 |
| 2002/0170727 A1 | 11/2002 | Holland et al. | |
| 2003/0111128 A1 | 6/2003 | Hannigan et al. | |
| 2004/0261876 A1 | 12/2004 | Warren et al. | |
| 2005/0247362 A1 * | 11/2005 | Harcourt et al. | 138/125 |
| 2006/0151042 A1 * | 7/2006 | Stringfellow et al. | 138/125 |
| 2008/0145579 A1 | 6/2008 | Nguyen et al. | |

FOREIGN PATENT DOCUMENTS

| | | | |
|---|---|---|---|
| GB | 1156433 | 2/1968 | |
| GB | 0916712.3 SR | 1/2010 | |

OTHER PUBLICATIONS

Military Spec Photograph of Device, CIRCA 1998.

PCT/US2009/049654 International Notification of Transmittal of the International Search Report and the Written Opinion of the International Searching Authority, Sep. 1, 2009, 10 Pages, ISA/US, Alexandria Virginia.

United Kingdom Patent Application Serial No. GB0916712.3, Office Action Dated Jul. 31, 2012, Filing Date: Sep. 23, 2009, Inventors Lockhart et al., Priority: U.S. Appl. No. 12/323,624.

* cited by examiner

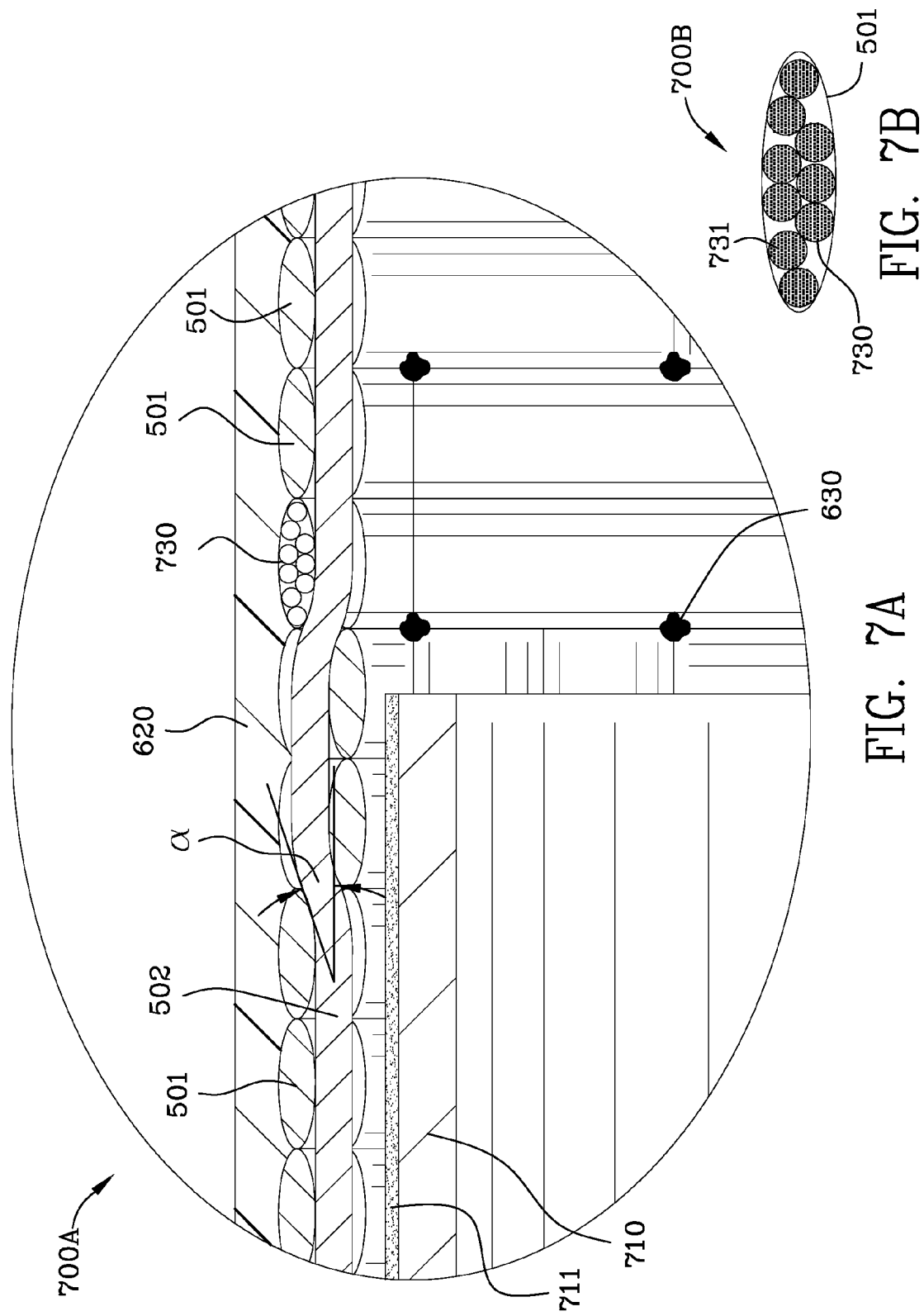

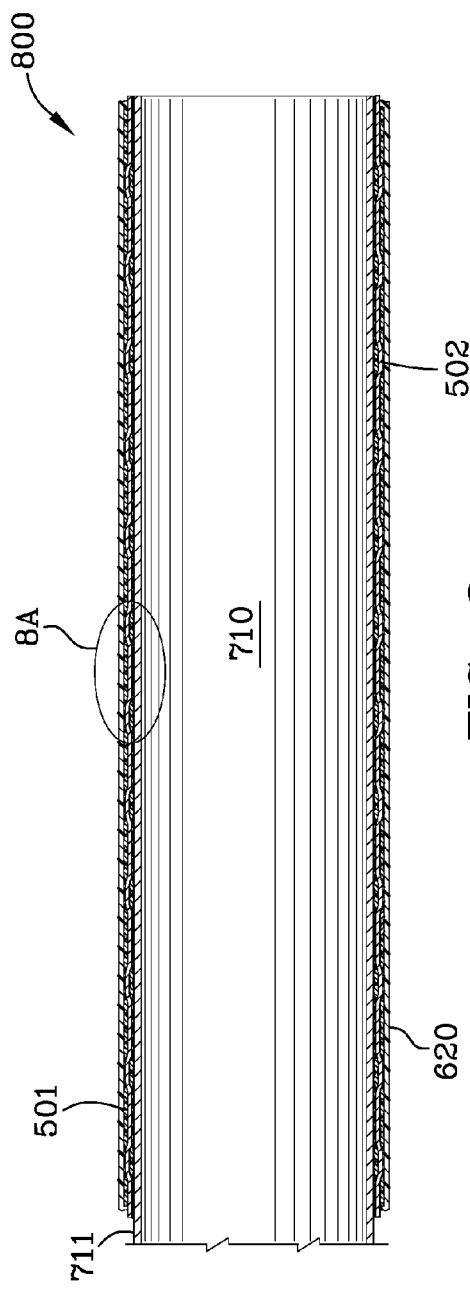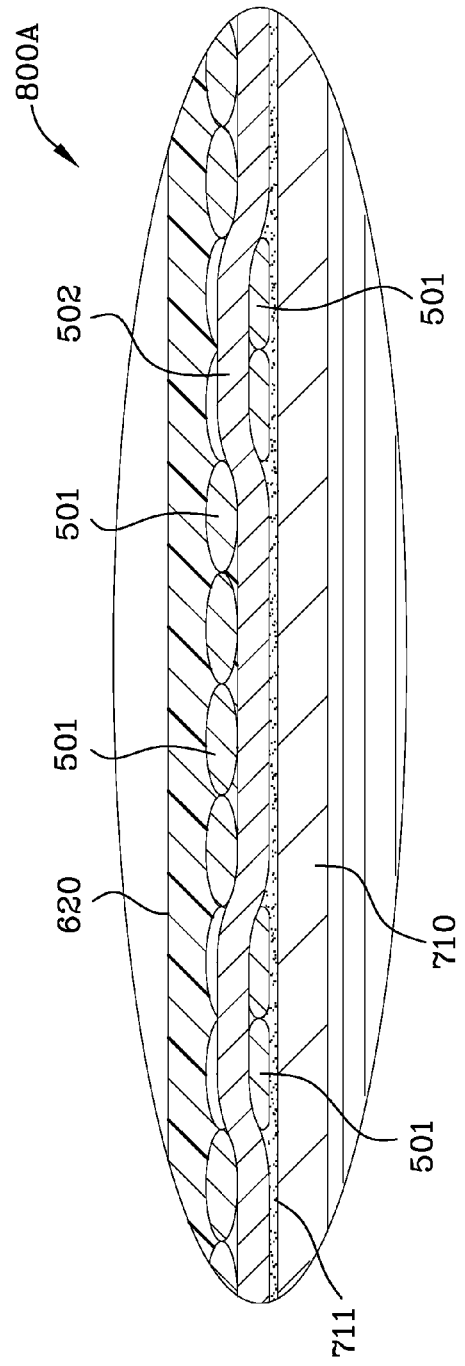

HOSE

FILED OF THE INVENTION

This invention is in the field of hoses and hose couplings.

BACKGROUND OF THE INVENTION

U.S. Pat. No. 4,940,261 to Sommer-Vine states in the Abstract that: "[t]his invention relates to a pipe coupling and, in particular, to a Victaulic-type coupling which generally comprise a pair of half shells, together forming a sleeve which can be placed around adjacent flanged or grooved ends of a pair of pipes which have been located in co-axial end to end relationship for joining. The pipe coupling of the invention comprises a pair of discrete, substantially identical half shells which are engageable with one another to form a coupling sleeve. The half shells each include a hook formation on one end thereof which is interengageable with the hook formation of the other half shell, partly to secure the half shells to one another."

U.S. Pat. No. 5,297,822 to Sanders et al. discloses in the Abstract that: "[a] hose construction, coupling therefor and methods of making the same are provided, the hose construction comprising a tubular hose and a coupling secured to one end of the tubular hose, the inner peripheral surface of the tubular hose comprising an inner corrugated hose made of polymeric material and having inwardly convex projections with recesses therebetween and extending from one end of the tubular hose to the other end thereof, the coupling having an insert disposed in the one end of the tubular hose and being radially outwardly expanded into sealing relation with the inner corrugated hose, the insert having an outer peripheral surface defined by a plurality of outwardly convex projections with recesses therebetween, the projections of the insert being respectively received in the recesses of the inner hose and the projections of the inner hose being respectively received in the recesses of the insert whereby the interior of the tubular hose is substantially sealed to the interior of the coupling."

U.S. Pat. No. 5,413,147 to Moreiras et al. discloses at col. 2, lns. 37 et seq. "[i]n accordance with the invention, a flexible hose comprises an inner corrugated tube of polymeric material impervious to the fluid to be conveyed through the hose, an intermediate layer of rubber material surrounding the inner corrugated tube, a braided layer of fiber reinforcement material, and an outer layer of rubber material surrounding the braided layer of fiber reinforcement. The corrugated tube has alternating radially outer ridges and radially outwardly opening grooves axially staggered in relation to alternating radially inner ridges and radially inwardly opening grooves with a void being left at the bottom of the radially outwardly opening grooves. The radially outer ridges of the inner corrugated tube preferably are flat for controlling the degree of penetration of the intermediate rubber layer into the radially outwardly opening grooves."

U.S. Pat. No. 4,593,942 to Loker states in the Abstract: "[a] coupling and method of coupling thin-walled/tubing and the like includes an inner member and an outer member in the form of a sleeve or band surrounding the inner member with the tubing therebetween. The inner member is provided with a pair of tubing grooves and a seal receiving groove between the two tubing grooves or at least between one groove and the tube receiving end of the coupling. By means of annular ridges, the tubing is forced into the tubing grooves, and by means of an annular ridge the tubing is pressed tightly against the seal in the seal receiving groove, thus forming a fluid-tight coupling member."

U.S. Pat. No. 4,486,036 to Storke et al states in the Abstract that: "[a] coupling and method of coupling thin-wall hose/tubing and the like includes an inner member, a sleeve surrounding the inner member and the tubing therebetween. The inner member is provided with a pair of tubing grooves and a seal material between the grooves. By means of compression rings or annular ridges the tubing is forced into the tubing grooves and stretched across the seal, thus forming a fluid-tight coupling member."

It is desirable, therefore, for a hose coupling to retain the hose at high pressure. A hose coupling which is capable of handling high pressure due to long pumping distances is required. For instance, in military applications fluid (which may be fuel) must be pumped long distances from a source to a destination. Longer transport distances (up to 660 feet) increase pump discharge pressures which may be up to 750 psig. Longer transport distances increase the demands on the pumping equipment, the length of the hose, and the number of couplings used to join the hoses together. It is common to run hose lines as long as 660 feet in length. The hose lines can be joined end to end and the transportation of fluids can be extended to several miles. Intermediary pumping stations may be used.

High pressures have heretofore caused difficulties in that large stresses have been applied to hose at pinch points within the couplings. Linear part lines in hose couplings cause particularly prominent problems with leakage as the pinch points perforate the hose. Prior art hose couplings have linear part lines which create linear pinch points. Prior art hose couplings also have sharp edges in the coupling parts which engage the hose and restrict the hose from stretching thus causing excessive tension to specific areas of the hose causing the fabric liner to split.

It is desirable, therefore, to provide a hose coupling which prevents tearing of the hose by allowing the hose to uniformly stretch. It is also desirable to provide a hose coupling device which avoids pinch points and part lines which cause leakage in the hose.

It is desirable to provide a hose which can be operated at high pressures to enable the long distance pumping of the fluid. As discharge pressure of the pump is increased (i.e., higher head), the distance between pumps can be increased or a single pump may be capable of pumping fluid longer distances.

SUMMARY OF THE INVENTION

A hose coupling which prevents the extraction of hose from the coupling is disclosed and claimed. The hose may be a liquid transfer hose or it may be a general purpose fire hose. The hose coupling comprises a tailpiece, a sleeve and a collar. The tailpiece includes an exterior, first sinusoidally shaped contour. The tailpiece also includes a cylindrically shaped interior through which fluid passes.

The exterior, first sinusoidally shaped contour of the tailpiece includes diamond shaped ed portions which grip the fire hose in engagement with the tailpiece as described herein. The sleeve includes an interior, second sinusoidally shaped contour reciprocal to the first sinusoidally shaped contour of the exterior of the tailpiece. The sleeve includes first and second halves and each half of the sleeve includes two sets of reciprocal fingers. Each set of reciprocal fingers of the first half of the sleeve engages and interfits a respective set of reciprocal fingers of the second half of the sleeve and the fingers are then interdigitated.

The exterior, sinusoidally shaped contour of the tailpiece includes first peaks and first valleys and the second interior, sinsusoidally shaped contour of the sleeve includes second peaks and second valleys. A hose which may be a fluid transport hose is disposed between the sleeve and the tailpiece. The first peaks of the tail piece interfit the second valleys of the sleeve and the first valleys of the tailpiece interfit the second peaks of the sleeve. The collar includes first and second halves each of which interengage the sleeve. The collar urges the sleeve against the hose which engages the first sinusoidally shaped contour of the exterior of the tailpiece and the diamond shaped knurled portions of the first sinusoidally shaped contour of the exterior of the tailpiece preventing extraction of the hose from the coupling. The knurl may be a straight circumferential knurl or it may assume any pattern shape.

The hose coupling joins two sections of hose together. The hose may be fire hose, fuel transfer hose or any hose of any type. The coupling retains the hose at a high pressure as compared to current couplings being manufactured. Also, the hose coupling has a Victaulic type end for joining two sections of hose. This joining method can be done in different ways, for example the Victaulic type connection just mentioned or it may be threaded.

The tailpiece of the invention includes a wave form (sinusoidal or other waveform) which prevents pinch points. Current couplings, for instance those which meet the "mil spec", create sharp edges causing tears and the like in the liners of the hose and in the fabric which supports those liners. "Mil spec" stands for military specification. Pinch points are also created in the prior art devices between various clamping components. Pinch points prevent the hose from stretching any allowable amount thus causing excessive tension in specific areas of the hose causing the fabric liner to split. The wave form used in the invention applies a constant force across the hose, thus reducing the stress on the fabric liner. The sleeve includes interlacing reciprocal fingers (interdigitated fingers) which prevent a straight line pinch point on the hose when the sleeves are clamped together and retained by the collars. A straight line pinch point can cause a leak path for fluid to egress. The latch assembly is made up of a pivot bar, bolts and washers. Bolts are partially threaded into the pivot bar which is placed in a retaining groove on one collar then swung into place on the other collar. Clamping can also be accomplished by threading the bolts directly into one of the collar halves. The function of the gasket is to prevent fluid egress into the coupling.

The gasket is installed into the groove on the tailpiece, then the hose is slid onto the tailpiece until it reaches the shoulder. The two sleeves are then placed on the outside of the hose. The collars are then placed with the parting line offset from the interlacing fingers of the sleeves. The assembly is then clamped together by means of equally applying torque to the bolts of the latch assembly.

A method for coupling hose is also disclosed and claimed. The method includes the steps of drawing hose over the exterior of the tailpiece. The tailpiece includes an undulating exterior surface and the inside diameter of the hose is slightly larger than the largest outside diameter of the hose gripping portion of the tailpiece. A shoulder which resides relatively close to the hose gripping end portion of the tailpiece has a larger diameter than the hose and therefore the hose is slid over the tailpiece until it abuts the shoulder. After the hose is in place over the tailpiece, the step of placing first and second sleeves on the outside of the hose is performed. Each sleeve half has interdigitated fingers for interengagement with fingers of the other half of the sleeve. Each sleeve includes undulating interior surfaces. Next, the first and second collar halves are placed over the first and second sleeves such that the joint between the first and second collars is rotationally offset from the interengagement of the interdigitated fingers of the sleeves. In practice, one of the sleeves will be positioned within one of the halves of the collars and it will rest on a surface and then the other collar will be placed on the top. Once positioned, the bolts pass through the collars and are secured in a pivot rod thus clamping the first and second sleeves to the hose. The bolts will then be tightened by torqueing, uniformly, the collars to each other urging them into forceful engagement with the sleeves compressing the hose between the undulating exterior surface of the tailpiece and the undulating interior surface of the sleeves. The method is particularly useful where the tailpiece includes diamond shaped knurled portions thereof.

The method includes steps of clamping and torqueing which are performed with pivot rods. The pivot rods reside in J-shaped slots in the exterior portions of the first and second collar halves. The pivot rods are threadedly interconnected with bolts secured within a respective one of the first and second collar halves. Using J-shaped slots together with the pivot rods enables rotation of one of the first and second coupling halves with respect to the other enabling removal of the hose from the coupling for reuse thereof.

A hose comprising an outer jacket which includes warp and weft yarns made of Vectran® is also disclosed and claimed. Both the warp and weft yarns of said outer jacket are arranged in a repeating 2-4-2-4 pattern forming a twill weave. The warp yarns are preferably seven-ply warp yarns and the weft yarns are preferably nine-ply weft yarns. Other plies may be used for both the warp and weft yarns. An outer polyurethane liner is extruded onto the outer jacket and the outer polyurethane liner extends through the weave in pillars. The pillars are nonuniform and do not extend through the jacket in a regular pattern.

An inner liner includes an exterior coated with adhesive and the inner liner engages the outer warp fibers, weft fibers and pillars of the outer jacket. The example of the hose disclosed herein has been tested to a pressure of 2250 pounds per square inch without bursting. Similarly, the hose coupling disclosed herein has been tested to a pressure of 2250 pounds per square inch without the extraction of the hose. A process for making the hose, comprises the steps of: forming an inner liner and coating the exterior thereof with adhesive; weaving, in a twill weave pattern, Vectran® yarn, in a repeating 2-4-2-4-2 pattern in both the warp and the weft directions; extruding polyurethane onto the woven vectran yarn, some of the polyurethane extending into pillars between the warp and weft yarn, forming an outer liner; inserting the inner liner coated with adhesive within the outer liner; and, pressurizing the inner liner with steam expanding the inner liner and the adhesive into engagement with the vectran yarn and polyurethane pillars of the outer liner. The 2-4-2-4 repeating pattern of the woven yarns forms small angles over and under the respective warp and weft yarns and the strength of the hose is enhanced using this pattern. Other warp and weft yarn patterns may be used and are specifically contemplated. The woven vectran yarn outer jacket is pulled over the mandrel under tension and the tension is low enough so as to not damage the Vectran® yarn. The tension is low because the polyurethane application is primarily to the outside of the Vectran woven jacket.

Vectran® yarn has high strength, excellent flex fatigue, chemical resistance and dimensional stability over a wide range of conditions.

It is an object of the invention to provide a hose which is dimensionally stable under varying climatic conditions.

It is a further object of the invention to provide a hose which includes Vectran® yarn woven in the warp and weft directions having a repeating weave pattern of 4-2-4-2.

It is a further object of the invention to provide a hose employing a Vectran® jacket and an inner liner secured thereto.

It is a further object of the invention to provide a hose employing a Vectran® jacket which is capable of handling high pressure.

It is a further object of the invention to provide a hose and a hose coupling which can withstand high pressure enabling the long distance transport of fluids.

BRIEF DESCRIPTION OF THE DRAWINGS

FIG. 7A is an enlargement of a portion of FIG. 7.

FIG. 7B is an enlargement of one ply used in the nine-ply weft yarn.

FIG. 8 is a cross-sectional view of the inner liner fully inserted within a section of the outer jacket/outer liner.

FIG. 8A is an enlargement of a portion of FIG. 8.

DESCRIPTION OF THE INVENTION

Figure 1:
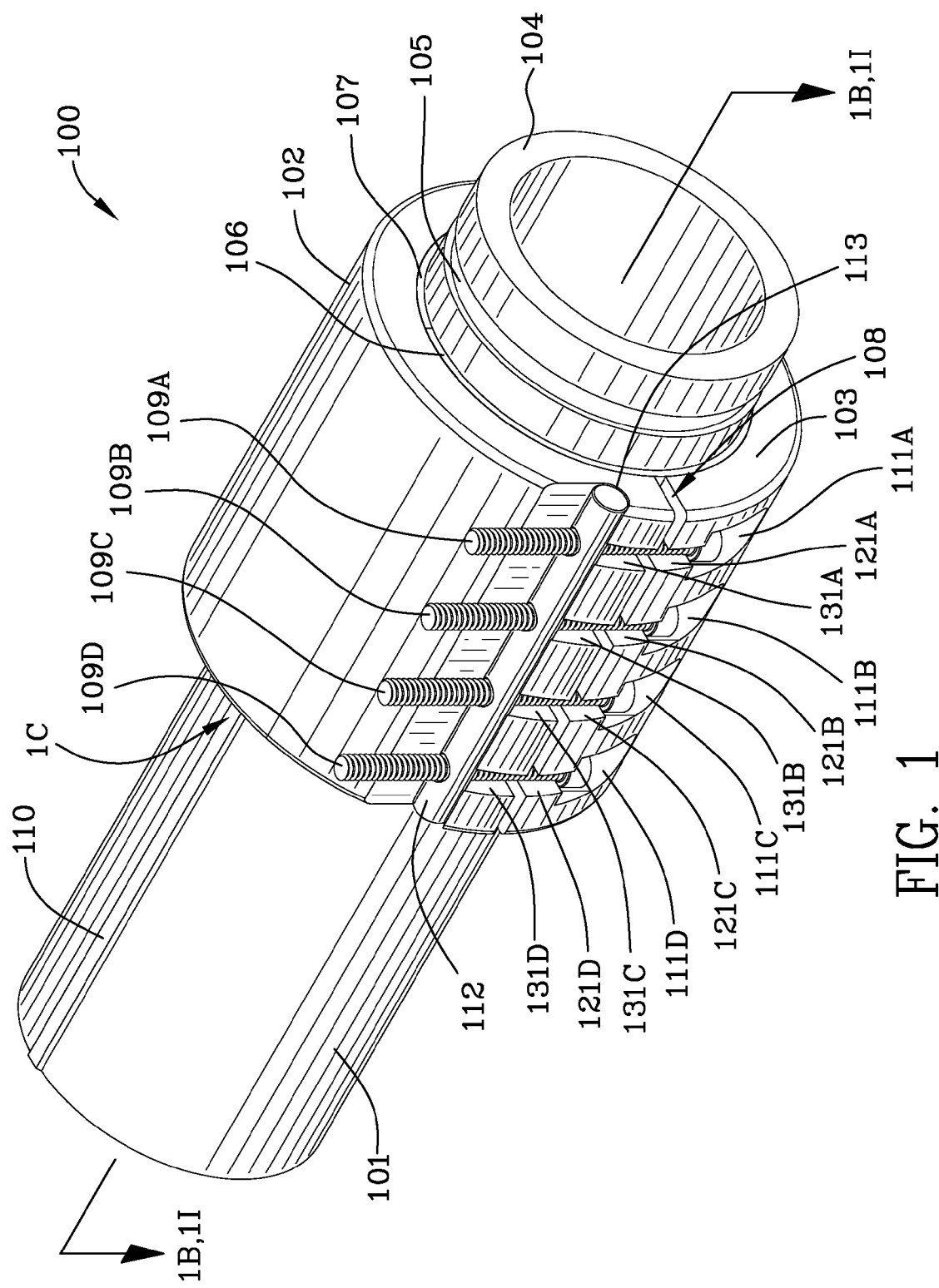
FIG. 1 is a front perspective view of the coupling and hose.

FIG. 1 is a front perspective view 100 of the coupling, sleeve halves 106, 107, tailpiece 104, hose 101, and collar 102, 103. The collar is made of two halves, a first collar half 102 and a second collar half 103. The collar halves and tailpiece may be made of any conductive metal such as aluminum or other non-corroding metal. The sleeves 106, 107 may be made of nylon or non-corroding metal such as aluminum. A grounding conductor 101M is illustrated as being slightly raised from the hose surface. The grounding conductor 101M electrically communicates any electrical potential through the conductor as well as all metal components in communication with the conductor 101M such as the collar half 102, tailpiece 104 and sleeve half 106.

Figure 1A:
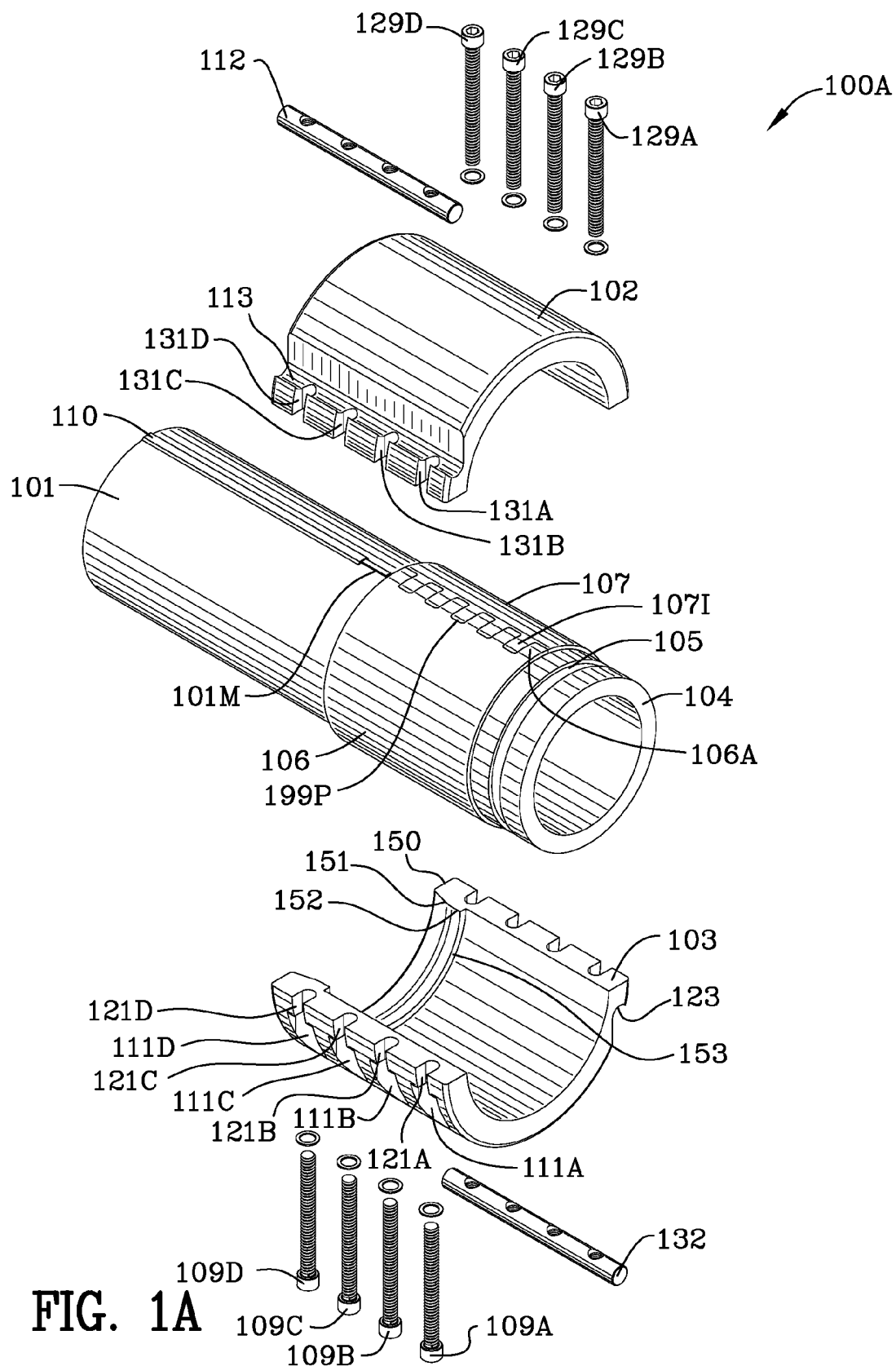
FIG. 1A is an exploded assembly view of the hose and coupling illustrating the hose, tailpiece and sleeve.
Figure 1B:
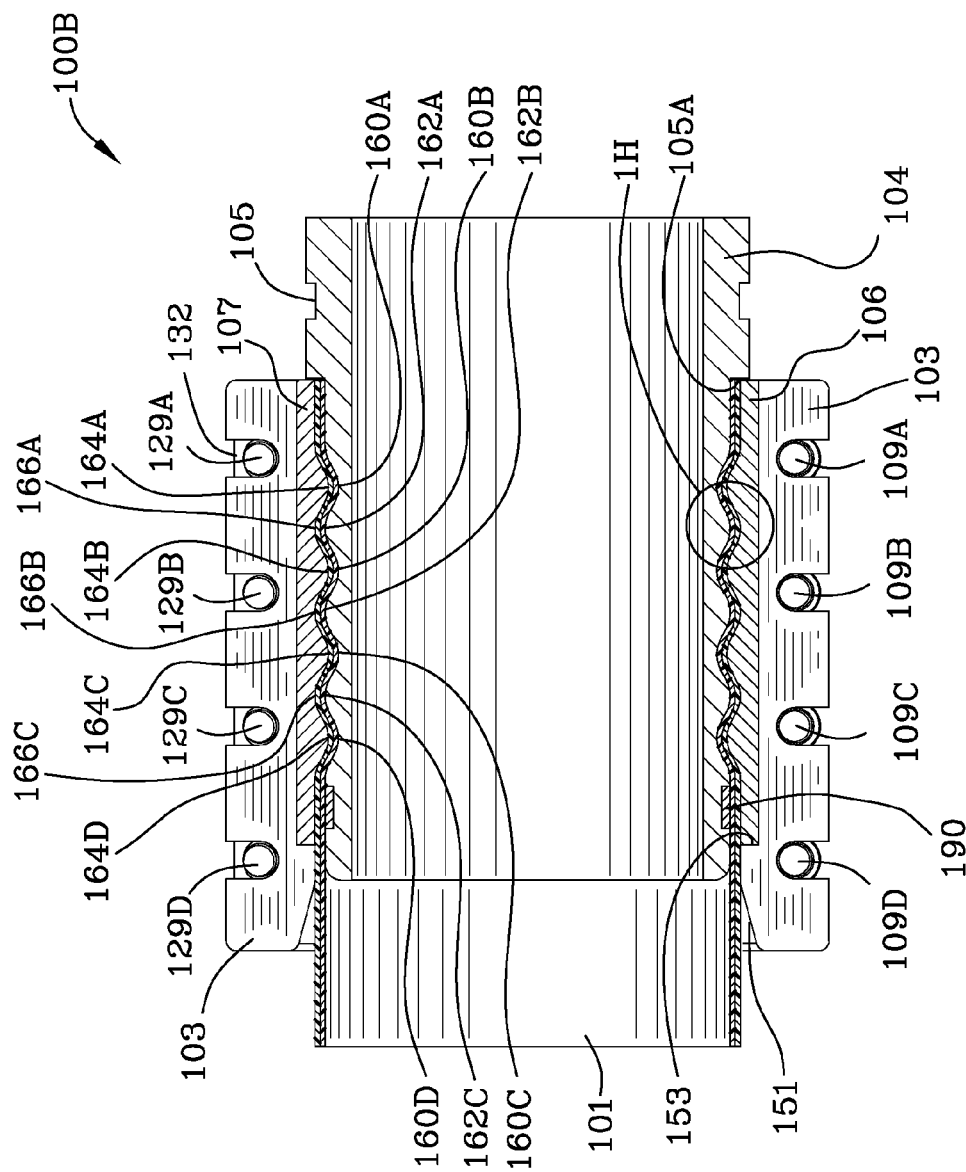
FIG. 1B is a cross-sectional view of the coupling and hose of FIG. 1 taken along the lines 1B-1B of FIG. 1.
Figure 1C:
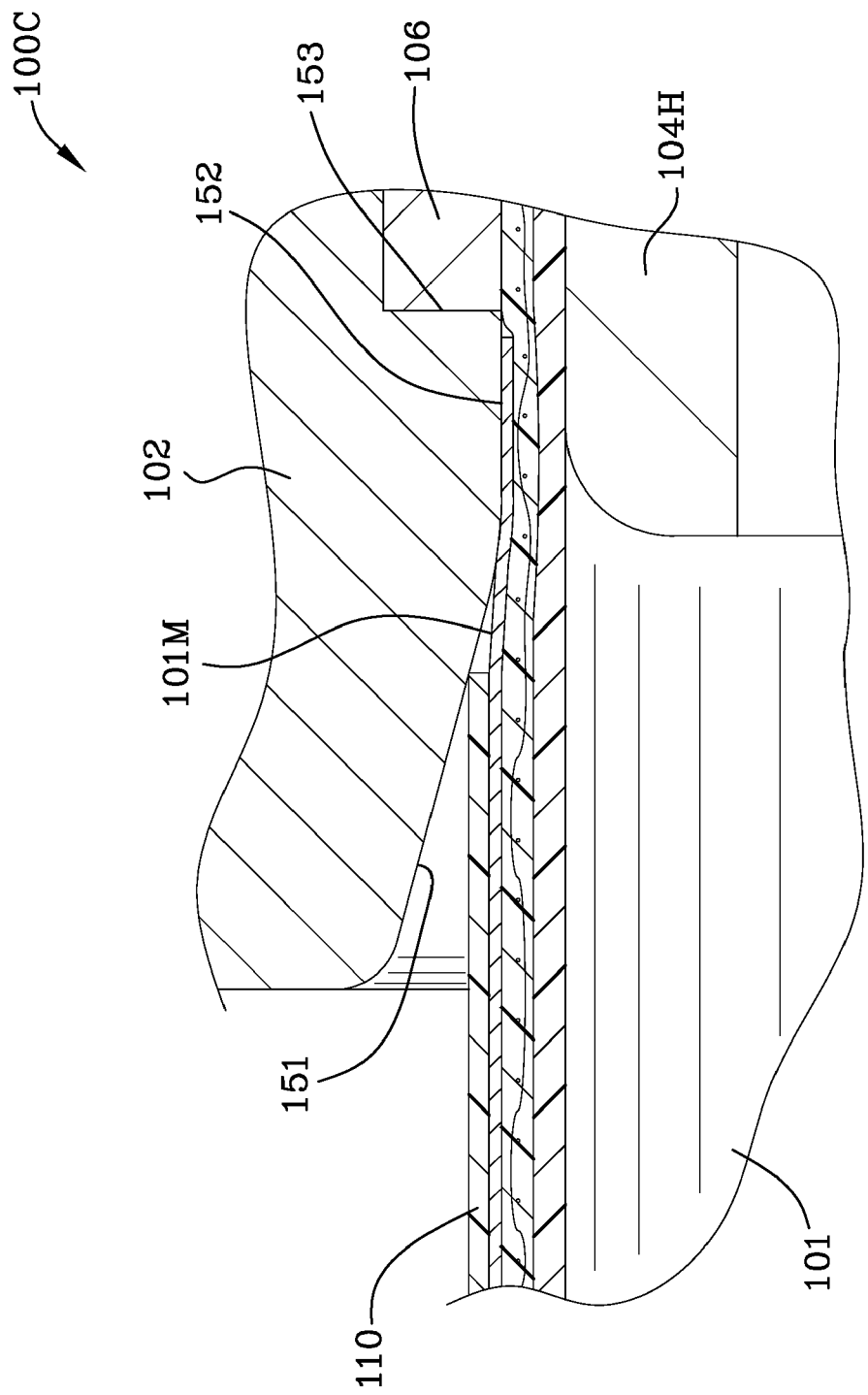
FIG. 1C is cross-sectional view taken of the area denoted by reference numeral 1C in FIG. 1.
Figure 2:
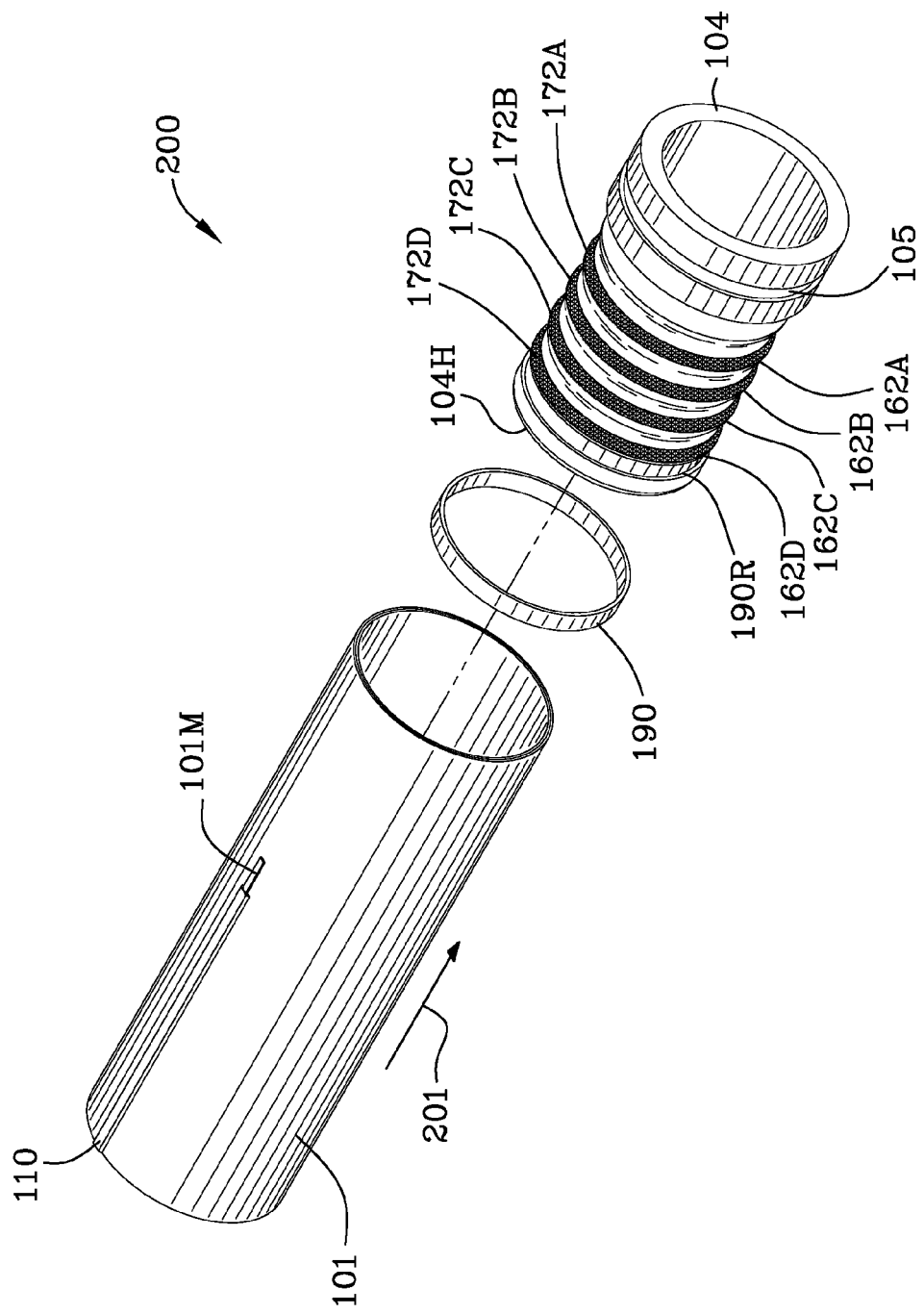
FIG. 2 is an exploded view of the hose positioned to be slid over the tail piece.

FIG. 1C is cross-sectional view 100C taken of the area denoted by reference numeral 1C in FIG. 1. The metal grounding conductor 101M is copper, aluminum or some other highly conductive metal and is illustrated in cross-section in engagement with collar 102. Collar 102 is, in turn, connected to a truck or ship and/or is otherwise grounded. Metal grounding conductor 101M is shielded by sheath 110 as viewed in FIGS. 1, 1A, and 1C. Sheath 110 is part of the outer liner of the hose. Grounding conductor 101M is not necessary if the hose is not transporting dangerous fluids or material which might combust. Metal grounding conductor 102 engages land 152 of the end of collar 102. Slope 151 forms a mouth of the hose end 104H of the collars 102, 103. If desired, the metal grounding conductor may engage the sleeve half 106 by cutting back the sheath 110 over the conductor 101M thus, in effect, extending the length of the conductor. It will be noticed that the hose is manufactured such that the metal grounding conductor 101M does not extend to the end of the hose. In this way the hose may be cut to the correct length and then slid (pulled over or drawn over) the tailpiece 104. Referring to FIG. 2, which is an exploded view 200 of the hose positioned to be slid over (pulled over or drawn over) the tail piece 104, reference numeral 201 indicates the direction of the hose 101 as it is positioned over the tailpiece 104. Hose 101 as viewed in FIG. 2 may be cut or shortened to the desired length to ensure that the metal grounding conductor 101M will engage the collar 102.

It is desirable, therefore, to provide a hose 101 using Vectran® fiber. Vectran ® fiber is a liquid crystal polymer fiber. The hose includes 3 layers: a liner (unnumbered), a jacket and a cover. The liner and cover 110 are polyurethane. The yarn used for the jacket is Vectran® which has high tensile strength and good strength retention for a wide range of temperatures. Vectran® is a registered trademark of Kuraray Co. Ltd. of Japan. In the circumferential (Weft) direction the pattern is preferably 2-4-2-4 and in the axial (Warp) direction the pattern is 4-2-4-2. Fiber diameter is measured as Denier 10500 in the Warp, 13500 in the Weft. See FIG. 1C wherein a weft pattern of 2-4-2-4 is shown. See FIG. 1H wherein a weft pattern of 2-1-2-1 is shown.

Referring to FIG. 1C, it will be noticed that the collar 102 is compressing the metal grounding conductor, the outer liner of the hose and the inner liner of the hose against the tailpiece 104. It will also be noticed that sleeve half 106 abuts interior shoulder 153 and sleeve half 106 also compresses the hose against the tailpiece 104.

Referring to FIG. 1, the coupling end includes a circumferential groove 105 for interconnection with another coupling device. Sleeve halves 106, 107 are interposed between the collars 102, 103 and form an exterior which is cylindrically shaped. See FIG. 1A which is an exploded assembly view 100A of the hose 101 and coupling illustrating the hose 101, tailpiece 104 and sleeve 106, 107. Gap 108 is between first 102 and second 103 coupling halves and is approximately 0.25 inches when the bolts are torqued. See FIG. 1. When gap 108 is, for example, 0.25 inches the sleeve halves 106, 107 are interengaged as illustrated in FIG. 1A. Bolts 109A, 109B, 109C and 109D interengage the second collar half 103 and are threaded into pivot rod 112. Pivot rod 112 is generally cylindrically shaped and is illustrated interengaging J-shaped seat 113 in the first upper collar half 103. FIG. 1A illustrates the bolts 129A, 129B, 129C and 129D which share the same configuration only on the opposite side of the hose coupling.

Referring to FIG. 1, openings or bolt head wells 111A, 111B, 111C and 111D and passageways 121A, 121B, 121C and 121D are illustrated in the second, bottom collar half 103. The first top collar half 102 includes bolt passageways 131A, 131B, 131C and 131D. Bolts 109A-D interengage the shoulders within the walls and when threaded in to the pivot rod 112 exert a clamping force on the sleeve 106, 107.

FIG. 1A is an exploded assembly view 100A of the hose 101 and coupling additionally illustrating the tailpiece 104 and sleeve 106, 107. The sleeve includes the first half 106 and the second half 107. First sleeve half 106 includes a set 106A of six interdigitated fingers and second sleeve half includes a set 107I of five interdigitated fingers. The interdigitated fingers 106A interfit with the interdigitated fingers 107I to form a non-linear part line 199P and thus the fingers are described herein as interdigitated. In this example a part line 199P having a general square wave shape is shown. Other shapes such as triangular wave shapes may be used. Further other non-linear shapes may be used. When the first sleeve half 106 and the second sleeve half 107 are brought together as shown in FIG. 1A they are within the collar halves 102, 103 and the collar urges them into the position illustrated (fully engaged) in FIG. 1A.

Still referring to FIG. 1A, second, bottom, collar 103 is illustrated together with shoulder 153. Land 152, slope 151 and hose end 150 of the collar are illustrated in the collar 103. Pivot rod 132 is cylindrically shaped and operates against J-shaped pivot rod seat 123. Shoulder 153 acts as a stop or seat for the first sleeve 106 and the second sleeve 107. If one side of the collar is secured by shorter threaded bolts which do not protrude significantly above the pivot rod, then the collar is may be rotated about the pivot rod. If the pivot feature is not desired then longer bolts may be used such as those illustrated by reference numerals 109A-D and 129A-D. The orientation of bolt passageways 131A-D, 121A-D, openings 111A-D and bolts 109A-D is viewed in FIG. 1A. Heads of bolts 109A-D and bolts 129A-D are viewed well in FIG. 1A and the seats for the bolts are viewed as part of FIG. 1A.

Figure 1D:
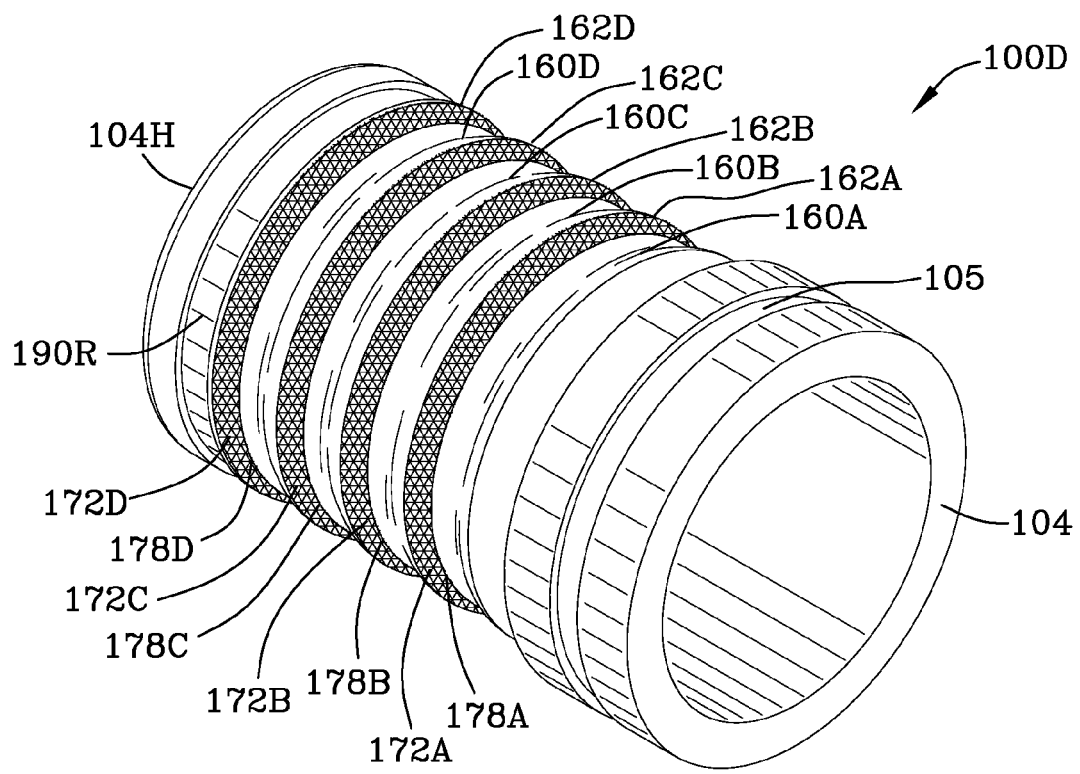
FIG. 1D is a perspective view of the tailpiece illustrating the exterior contour of the tailpiece and the diamond shaped knurl.
Figure 1E:
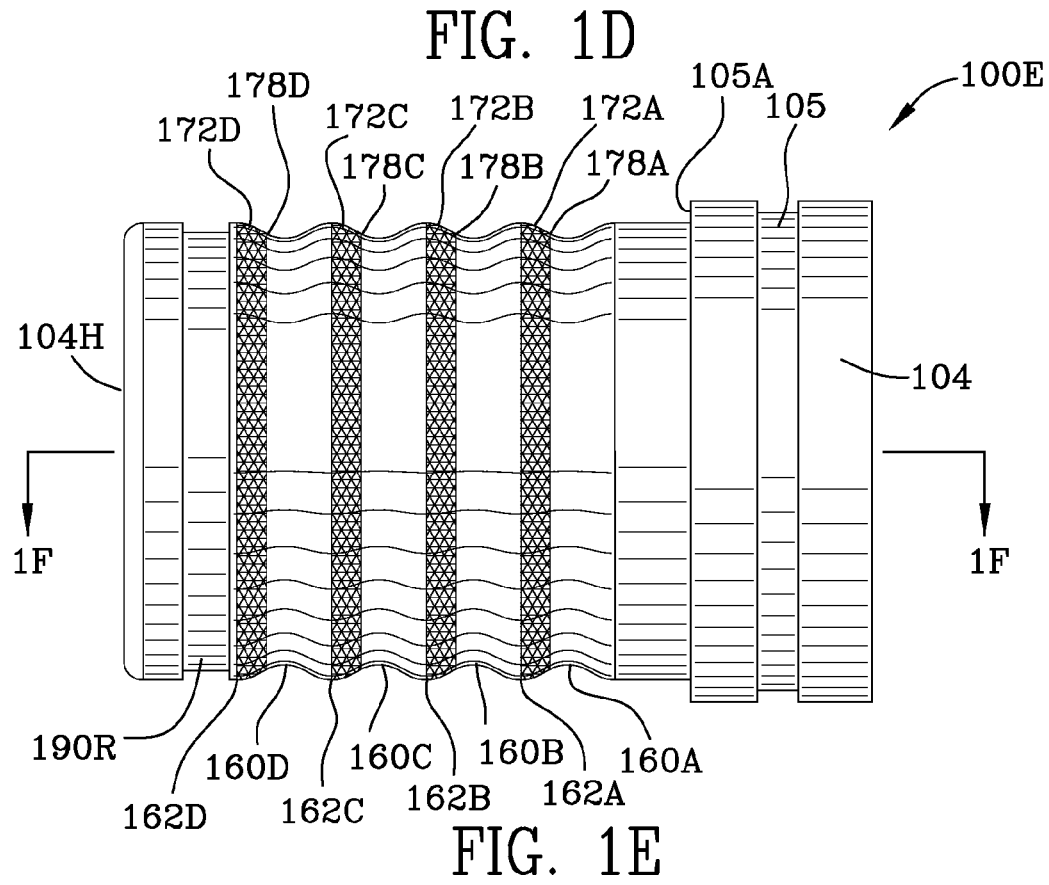
FIG. 1E is a front view of the tailpiece.

FIG. 1D is a perspective view 100D of the tailpiece 104 illustrating the sinusoidally shaped exterior contour of the tailpiece and four diamond shaped knurled surfaces 172A-D. Other knurl geometries may be machined into a portion of the exterior contour of the tailpiece. The diamond shaped knurled portions may have various thicknesses and use various pitches. FIG. 1E is a front view 100E of the tailpiece 104. Referring to both FIGS. 1D and 1E, it will be noticed that each of the diamond shaped knurled surfaces begins at the points on the surface contour of the tailpiece 104 denoted by 178A-D. Specifically, the position at which the diamond shaped knurled portion begins is equivalent approximately to the sin 30° and then the diamond shaped knurled portion is discontinued at approximately the sin 90° measured with a point of reference being at valley 160A with a vector rotating counterclockwise. Different sinusoidal waveforms may be used on the surfaces of the tailpiece and on the surfaces of the sleeve. For instance, different frequencies may be used. For example, the sinusoidally shaped exterior contour may be higher or lower in frequency. The sleeve would also include an interior surface which would be at the same higher or lower frequency of the tailpiece. Valleys 160A-D are low spots or minimums in the tailpiece with the interior of the tailpiece being a low reference. By minimum/valley it is meant that those points are a minimum radial distance from the centerline of the tailpiece. Minimums/valleys occur when sin 0° occurs measured with a point of reference being at valley 160A with a vector rotating counterclockwise.

Figure 1F:
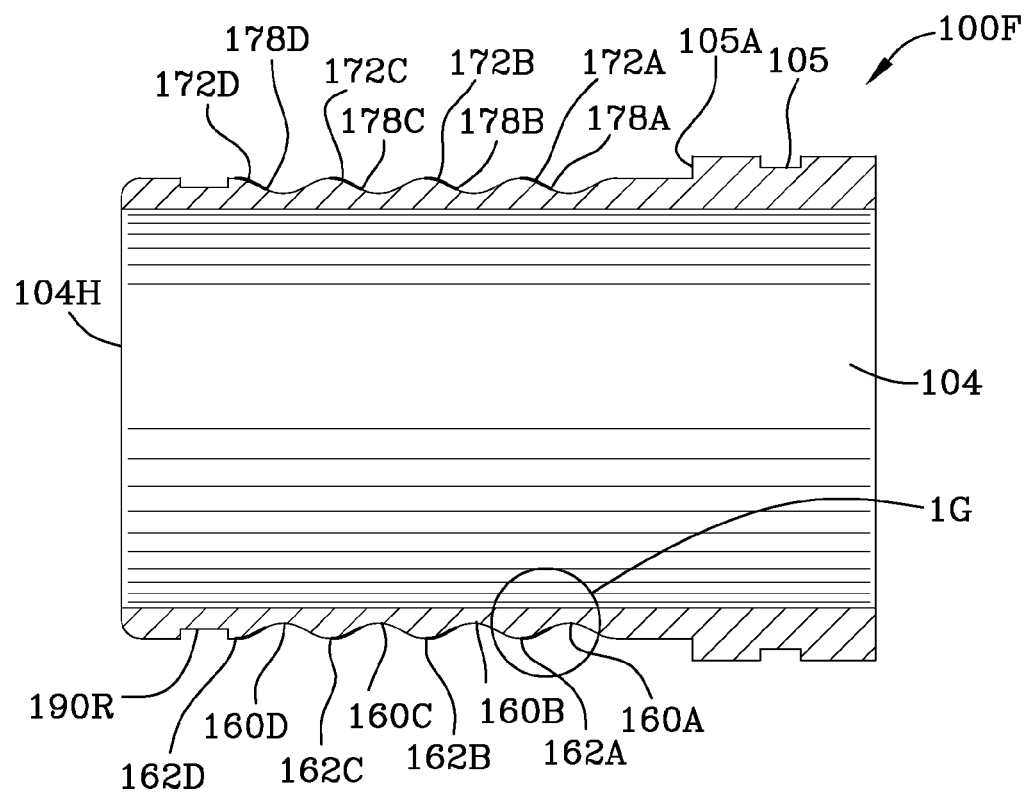
FIG. 1F is a cross-sectional view of the tailpiece taken along the lines 1F-1F of FIG. 1E.

Referring to FIG. 1F, a cross-sectional view 100F of the tailpiece 104 taken along the lines 1F-1F of FIG. 1E, valleys 160A-D and peaks (maximums) 162A-D are illustrated. By peaks and maximums, it is meant that those points are at a maximum radial distance from the centerline of the tailpiece. Peaks/maximums occur when sin 90° occurs measured with a point of reference beginning at valley 160A with a vector rotating clockwise. The diamond shaped knurled portions 172A-D of the surface appear as a thin line in FIG. 1F on the surface of the tailpiece. FIG. 1 illustrates shoulder 105A which restricts the hose as it is pulled (or drawn) over the tailpiece. The tailpiece includes an interior surface which is cylindrically shaped.

Peaks 162A-D and valleys 160A-D of the contour of the exterior surface of the tailpiece are illustrated in FIGS. 1D, 1E, and 1F. Reference numeral 104H denotes the hose side of the tailpiece. Recess 190R receives an elastomeric seal 190 (gasket) as illustrated in FIG. 2. FIG. 2 is an exploded view 200 of the hose positioned to be slid over (pulled over or drawn over) the tail piece 104. Reference numeral 201 indicates the direction of the hose 101 as it is positioned over the tailpiece 104. FIG. 1F illustrates the sinusoidal pattern or undulating pattern of the hose-gripping portion of the exterior surface of the tailpiece 104. The hose-gripping portion of the tailpiece 104 is the portion to the left of shoulder 105A when viewing FIG. 1F.

Figure 1G:
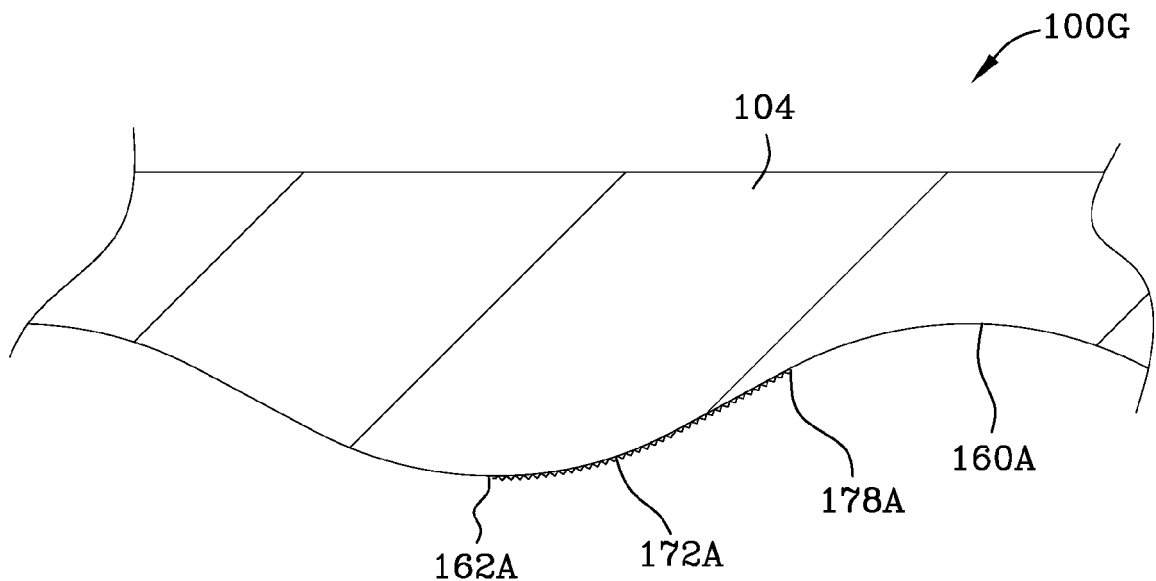
FIG. 1G is an enlarged portion of FIG. 1F illustrating the diamond shaped knurl on a portion of the contour/surface of the tailpiece.

FIG. 1G is an enlarged portion 100G of FIG. 1F illustrating the diamond shaped knurled portions 172A of the surface of the tailpiece 104. The diamond shaped knurled portions begin at approximately the point where sin 30° of a vector rotating counterclockwise is indicated. The diamond shaped knurled surfaces may be made to assume various surface characteristics, for example, the diamond shapes may vary dimensionally. Other shapes may be used instead of the diamond shapes.

Figure 1H:
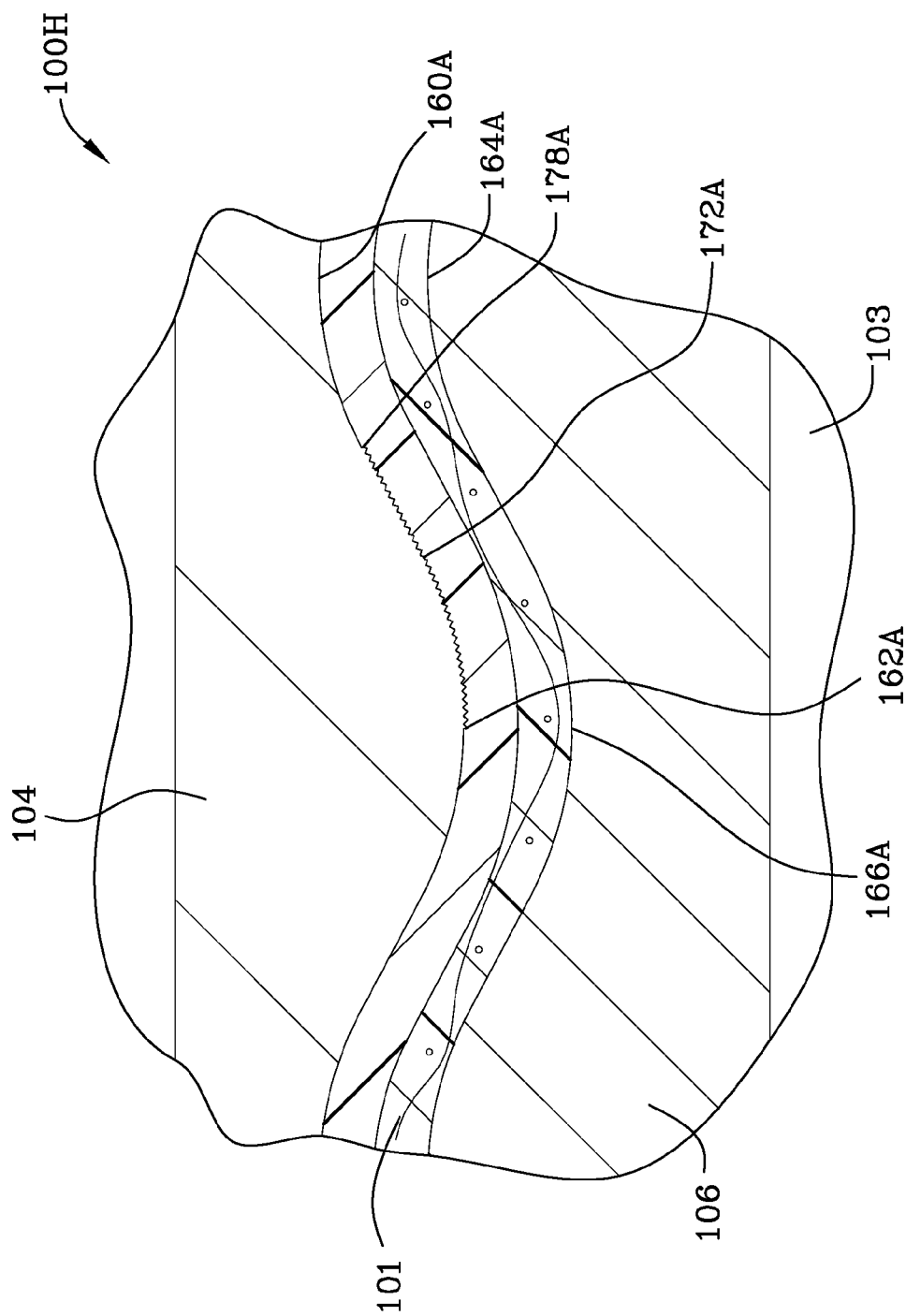
FIG. 1H is an enlargement of a portion of FIG. 1B illustrating the hose sandwiched between the tailpiece and one half of the sleeve.

FIG. 1H is an enlargement of a portion 100H of FIG. 1B illustrating the hose 101 compressed between the tailpiece 104 and the first half 106 of the sleeve. The diamond shaped knurled portion is indicated by reference numeral 172A. FIG. 1H illustrates that the diamond shaped knurl begins at a point 178A on the exterior surface of the tailpiece 104. The smooth contour of the undulating peaks and valleys of the tailpiece and the sleeve do not tear the hose 101 and its warp and weft fibers therein upon high pressurization of the hose and thus application of a large force in the leftward direction on the hose when viewing FIG. 1H. Additional the diamond shaped knurled surface 172A does not penetrate into hose 101 very deeply but retains the hose and its outer liner very well.

FIGS. 1B and 1H illustrate that valleys/minimums 160A-D of the tailpiece correspond to peaks/maximums 164A-D of the sleeve. The sleeve has as its "low" reference the exterior thereof such that the valleys/minimums occur toward the exterior of the sleeve and that the peaks/maximums occur toward the interior of the sleeve. Further, it can be seen from FIGS. 1B and 1H that valleys/minimums 166A-D of sleeve correspond to peaks/valleys 162A-D of the tailpiece.

FIG. 1B is a cross-sectional view 100B of the coupling and hose 101 of FIG. 1 taken along the lines 1B-1B of FIG. 1 illustrating the undulating contours of the tailpiece 104 and the sleeves 106, 107. Bolts 109A-D and their seats, bolts 129A-D and pivot rod 132, are viewed in relation to second collar half 103 in FIG. 1B.

Figure 2A:
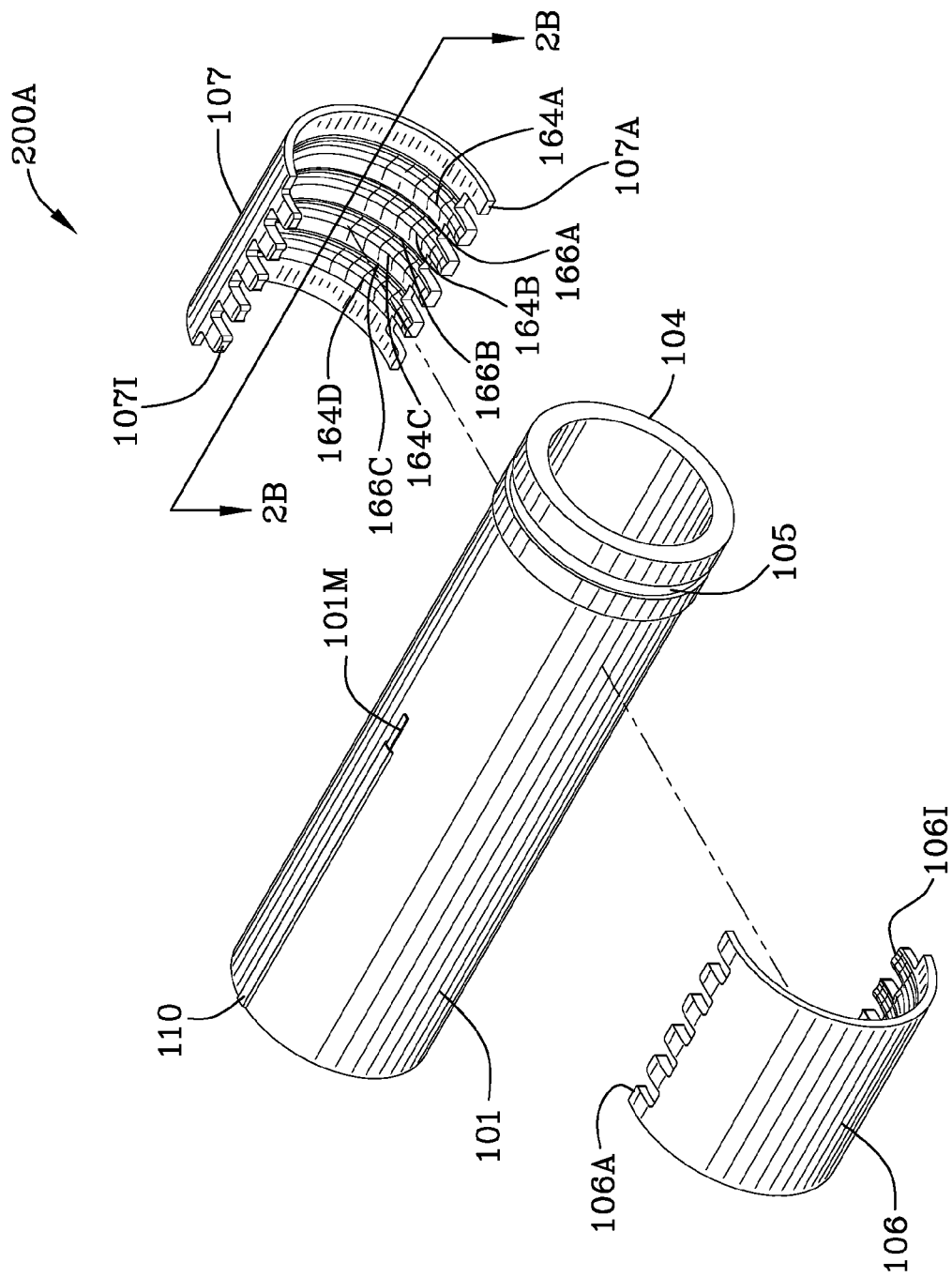
FIG. 2A is an exploded view of the hose residing over the tailpiece.
Figure 2B:
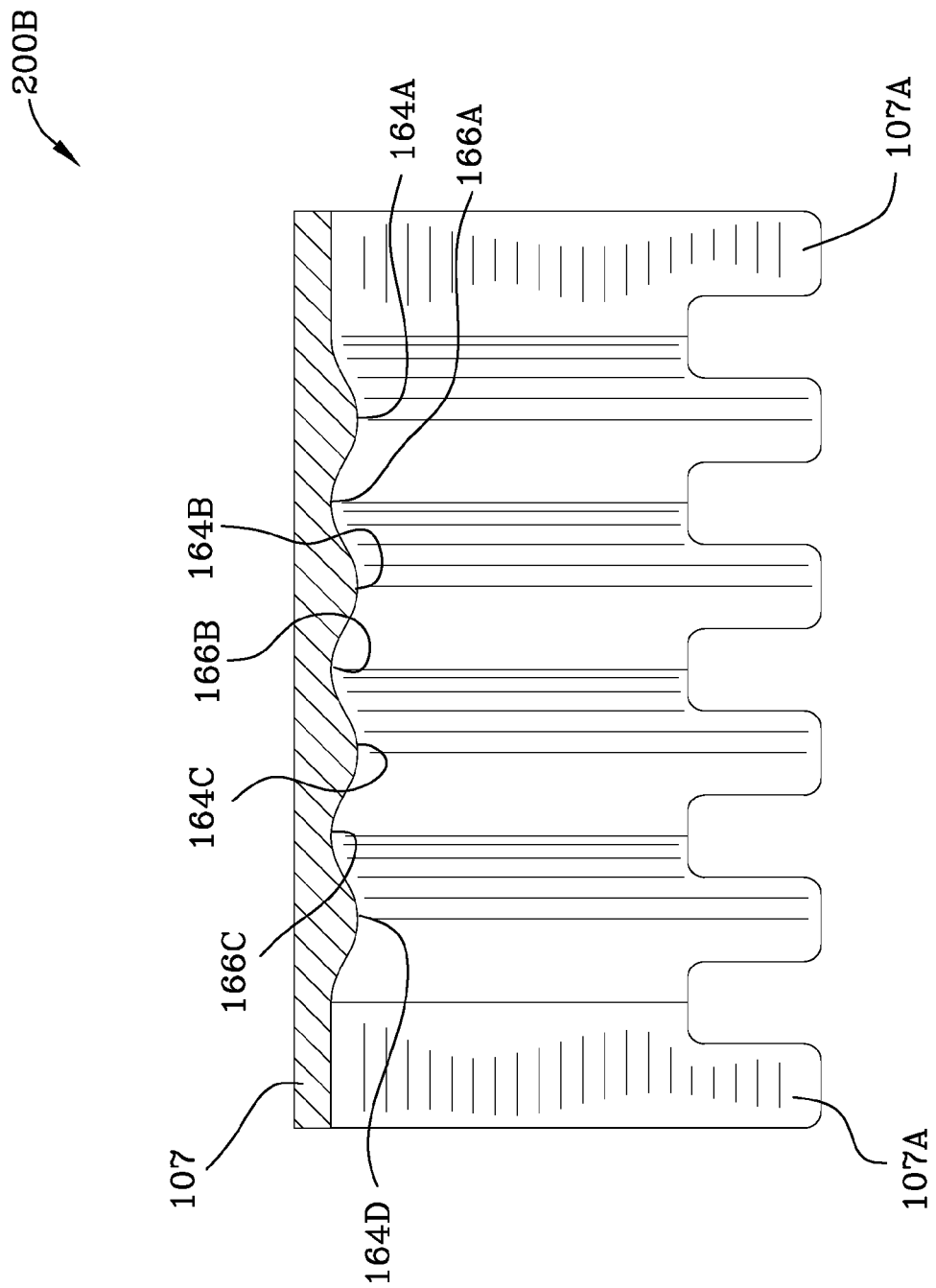
FIG. 2B is a cross-sectional view of one-half of the sleeve taken along the lines 2B-2B of FIG. 2A.

FIG. 2A is an exploded view 200A of the hose 101 residing over the tailpiece 104. As viewed in FIG. 2A, hose 101 is shown over the tailpiece and against the tailpiece shoulder 105A. Tailpiece shoulder 105A is illustrated in FIG. 1F. Maximums/peaks 164A-D are illustrated in sleeve half 107 as are minimums/valleys 166A-D. Set 107I of fingers and set 107A of fingers are illustrated for sleeve half 107 in FIG. 2A. Set 106I of fingers and set 106A of fingers are illustrated for sleeve half 106 in FIG. 2A. Each of the fingers is approximately 1 inch long and has a radii of approximately 0.125 inches. Different length fingers and differently shaped fingers may be used. The radii of the fingers occurs at the inner and outer portions of the fingers. FIG. 2B is a cross-sectional view 200B of one-half of the sleeve 107 taken along the lines 2B-2B of FIG. 2A illustrating the sinusoidal pattern of the interior portion of the sleeve. Again, minimums 166A-C and maximums 164A-D of the sine wave and fingers 107A are shown in FIG. 2B.

Referring to FIG. 1A, the sleeve comprises a first sleeve half 106 and a second sleeve half 107. Set 106A of six interdigitated fingers and set 107I of five interdigitated fingers are shown interleaved together. In this view sleeve halves 106 and 107 are shown forming a cylinder. As shown in FIG. 1A, the hose within the generally cylindrically-shaped sleeve conforms to the interior undulating waveform of the sleeve and the undulating waveform of the exterior of the tailpiece. In so doing, the length of the hose within the intermating undulating waveforms of the tailpiece and the sleeve is longer as the path along a sine wave is longer than the axis of the sine wave. Therefore, additional hose must be slid into the interface between the tailpiece and the sleeve as they are being assembled together as shown in FIG. 1A. Alternatively, the hose may be longer, initially, overlapping shoulder 105A and then cut when the sleeves are placed over the hose and the tailpiece. Some hose is trapped between set 106A of six interdigitated fingers and set 107I of interdigitated fingers along the part line 199P. This is because the inside diameter of the hose as shown in FIG. 2A is slightly larger than the largest diameter of hose gripping portion (portion to the left of shoulder 105A) of the tailpiece. When the hose is forced to conform to the waveforms of the sleeve 106, 107 and the exterior of the tailpiece 104 there is excess hose which is trapped in the part line 199P between sleeve halves 106, 107. Part line 199P forms a square wave such that excess hose is trapped both longitudinally and circumferentially. Differently shaped part lines may be used. Part line 199P prevents hose perforations when the collar halves 102, 103 urge the collar against the sleeve halves 106, 107. It will be noticed that the collars are arranged such that gap 108 therebetween is located approximately 90° from the part line 199P. FIG. 1 illustrates gap 108 between collar halves 102, 103 which is approximately 90° from the unnumbered joint between sleeve 106, 107.

Figure 2C:
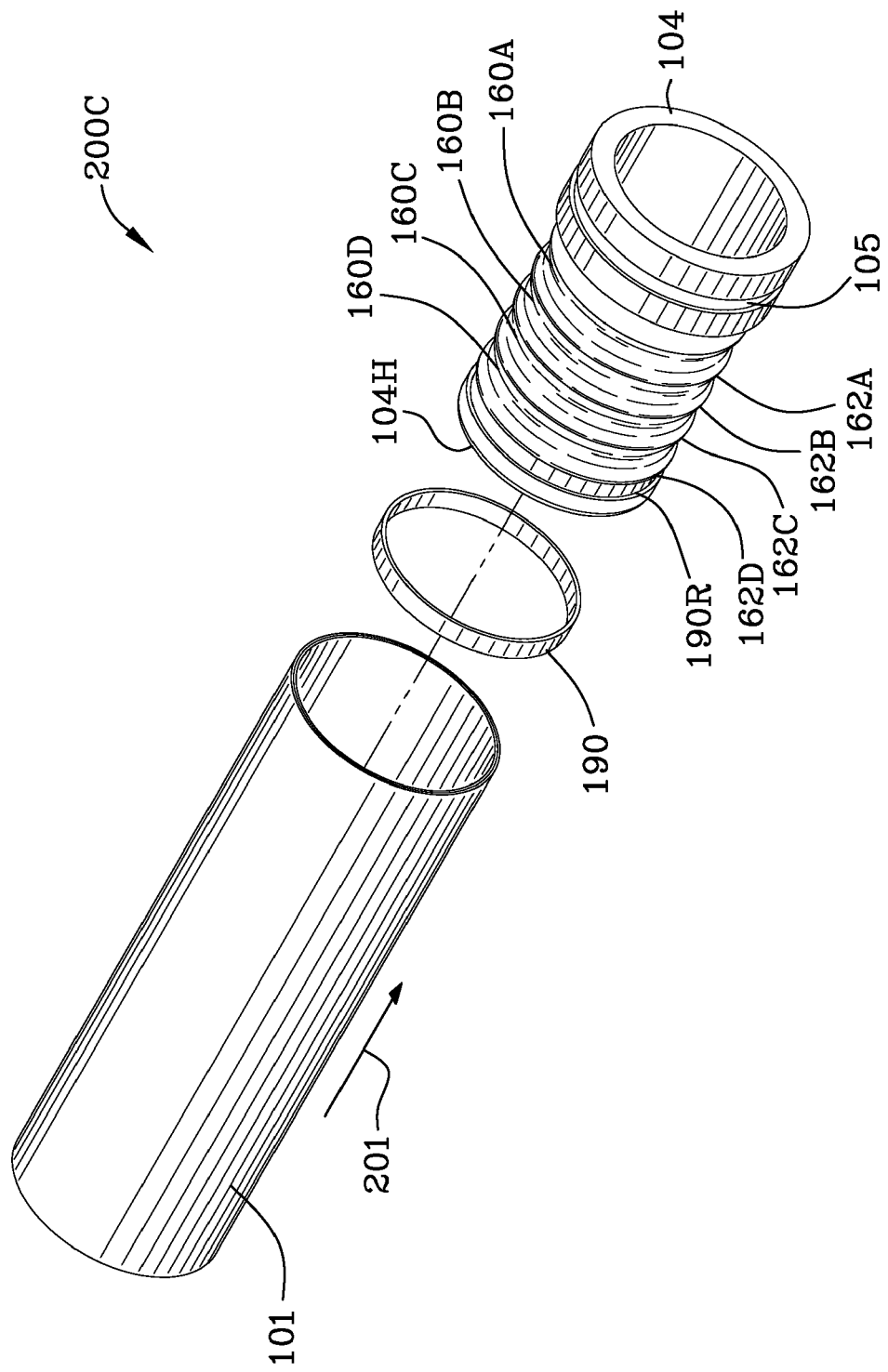
FIG. 2C is an exploded view of the hose positioned to be slid over a tail piece (without knurled portions).

FIG. 2C is an exploded view 200C of the hose positioned to be slid over a tail piece that does not have a knurled surface. Smaller hose diameters do not require a tail piece with knurled exterior surfaces. FIG. 2C illustrates a hose that does not have a metallic grounding wire embedded therein.

Figure 3:
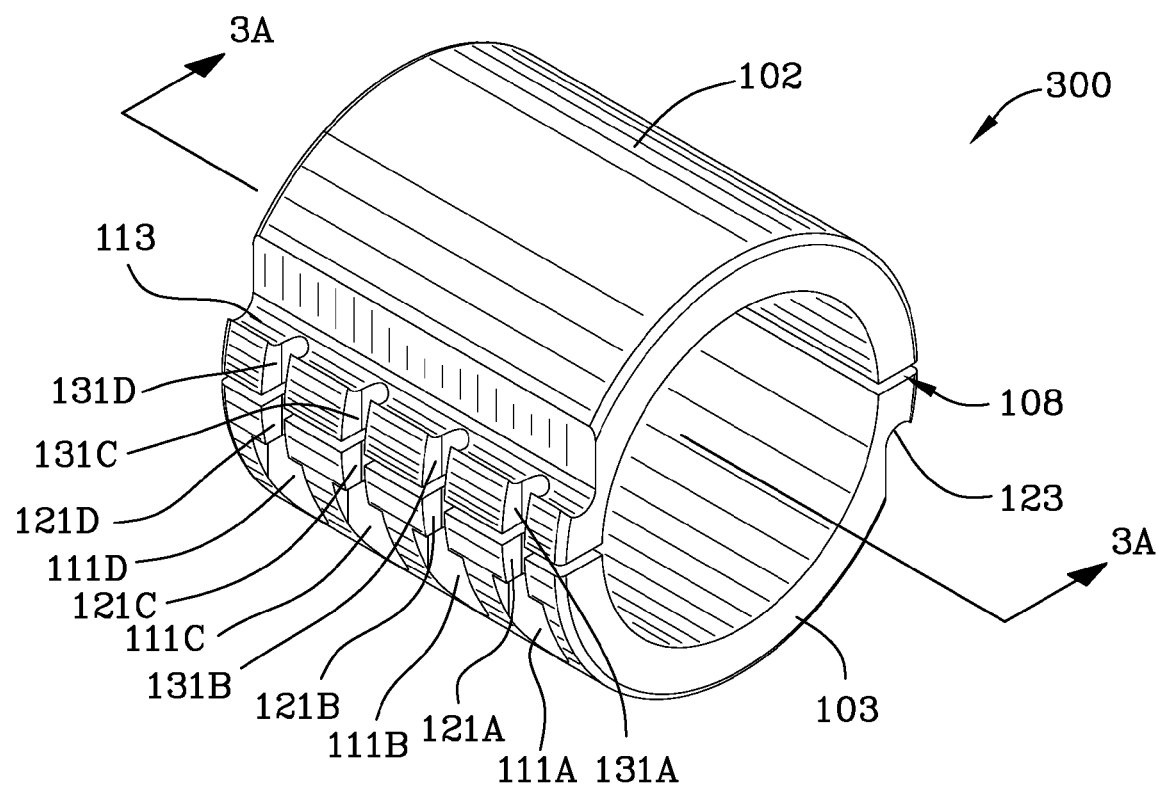
FIG. 3 is a perspective view of the two halves of the collar.
Figure 3A:
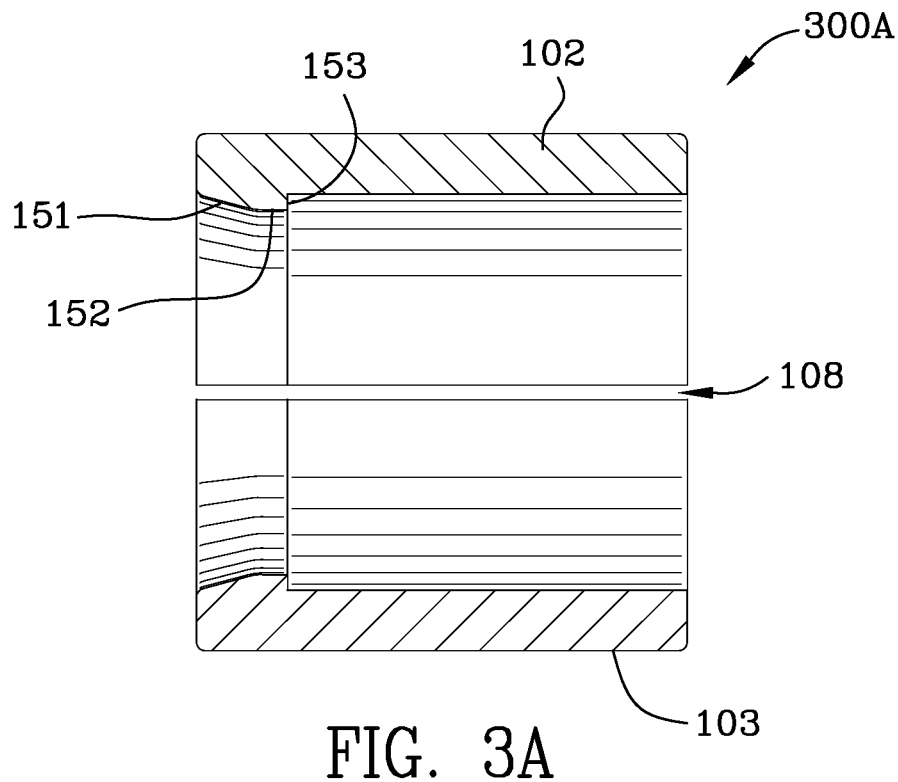
FIG. 3A is a cross-sectional view of the two halves of the collar taken along the lines 3A-3A of FIG. 3.
Figure 3B:
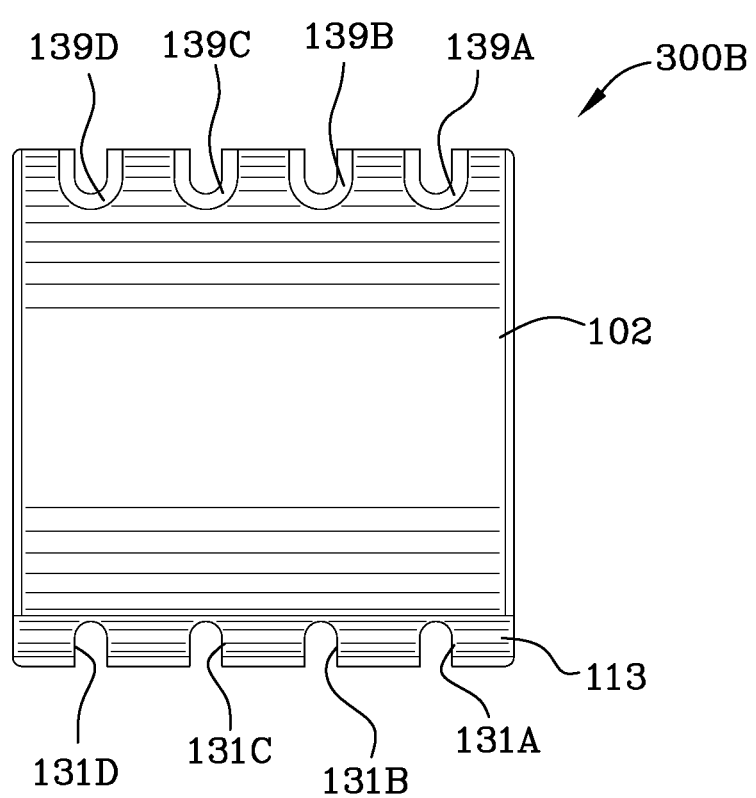
FIG. 3B is a top view of the collar.

FIG. 3A is a cross-sectional view 300A of the two halves 102, 103 of the collar taken along the lines 3A-3A of FIG. 3 illustrating the slope 151 and land 152 of the mouth of the collar. The slope is approximately 15°. J-shaped portions 113, 123 of the respective halves 102, 103 are illustrated. Seats 139A-D are illustrated in FIG. 3B. Bolts 129A-D engage seats 139A-D when the collar is in the clamping state or condition as illustrated in FIG. 1. See FIG. 3.

Referring to FIGS. 1B and 1H, the maximums of the sleeve 164A-D are spaced about 0.150 inches from the minimums of the tailpiece 160A-D. Similarly the minimums of the sleeve 166A-D are spaced about 0.150 inches from the maximums of the tailpiece 162A-D. Simply put, when the sleeve halves 106, 107 interengage each other as illustrated in FIG. 1A, and are tensioned as illustrated in FIG. 1, there is a gap of approximately 0.150 inches between the hose gripping portion of the tailpiece and the sleeves. The hose thickness is nominally greater than the gap thickness for the example illustrated in the drawing figures. The drawing figures depict an application for a nominal six inch diameter hose. Nominally the maximum peak to peak diameter of the tailpiece 104 shown in the figures is 6.05 inches (for example 162A-162A) and the nominal minimum valley to valley (for example 160A-160A) diameter is 5.65 inches which represents a sinusoidal exterior waveform having an amplitude of approximately 0.4 inches peak to valley. Similarly, the nominal maximum of the valley to valley diameter of the sleeves 106, 107 shown in the figures is 6.35 inches (for example 166A-166A) and the nominal peak to peak diameter is 5.95 inches (for example 164A-164A) which represents a sinusoidal interior waveform having an amplitude of approximately 0.4 inches peak to valley. The hose is compressed as illustrated in FIG. 1H within the sleeve 106, 107 and the tailpiece 104 and a portion of the hose is pinched between part line 199P. See FIG. 1A. When the sleeve is urged by the collar halves 103, 104 into the position illustrated schematically in FIG. 1A, the outside diameter of the sleeve 106, 107 is 6.90 inches. The inner diameter of the collar is 6.90 inches when the bolts are tightened within the pivot rods to achieve an approximate gap 108 of 0.25 inches. Sleeve 106, 107 is made of aluminum which prevents collar 102, 103 over-tightening.

Different hose sizes and differently dimensioned tailpieces, sleeves and collars may be used. The examples are given as ways to implement the invention and those skilled in the art will recognize that changes may be made without departing from the spirit and scope of the invention as claimed.

Figure 4:
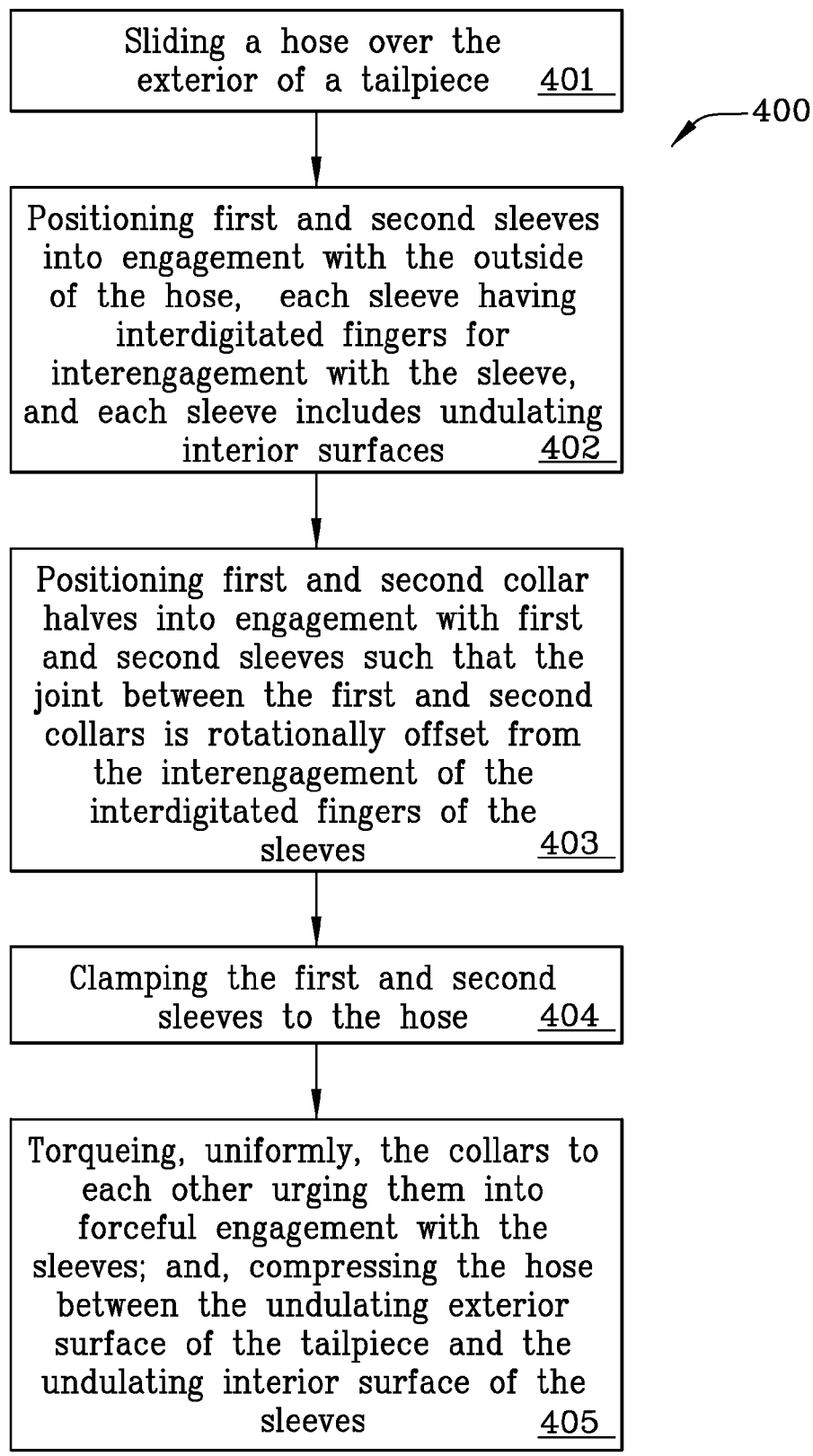
FIG. 4 is a schematic of the process steps for using the coupling.

FIG. 4 is a schematic 400 of the process steps for using the coupling. The steps include sliding a hose over the exterior of a tailpiece 401; positioning first and second sleeves into engagement with the exterior of the hose 402; each sleeve has fingers for interengagement with fingers from another half of the sleeve, and each sleeve includes undulating interior surfaces; positioning first and second collar halves into engagement with first and second sleeves such that the joint between the first and second collars is rotationally offset from the interengagment of the interdigitated fingers of the sleeves 403; clamping the first and second sleeves to the hose 404; torqueing, uniformly, the collars to each other urging them into forceful engagement with the sleeves, and, compressing the hose between the undulating exterior surface of the tailpiece and the undulating interior surface of the sleeves 405.

The method for coupling hose may accomplish clamping and torqueing with the use of pivot rods. The pivot rods reside in J-shaped slots in the exterior portions of the first and second collar halves. The pivot rods are threadedly interconnected with bolts secured within a respective one of the first and second collar halves. The J-shaped slots enable rotation of one of said first and second coupling halves with respect to the other enabling removal of the hose from the coupling for reuse thereof. Alternatively, instead of using the pivot rods the bolts may directly thread into the other half of the coupling.

Figures 5, 5B:
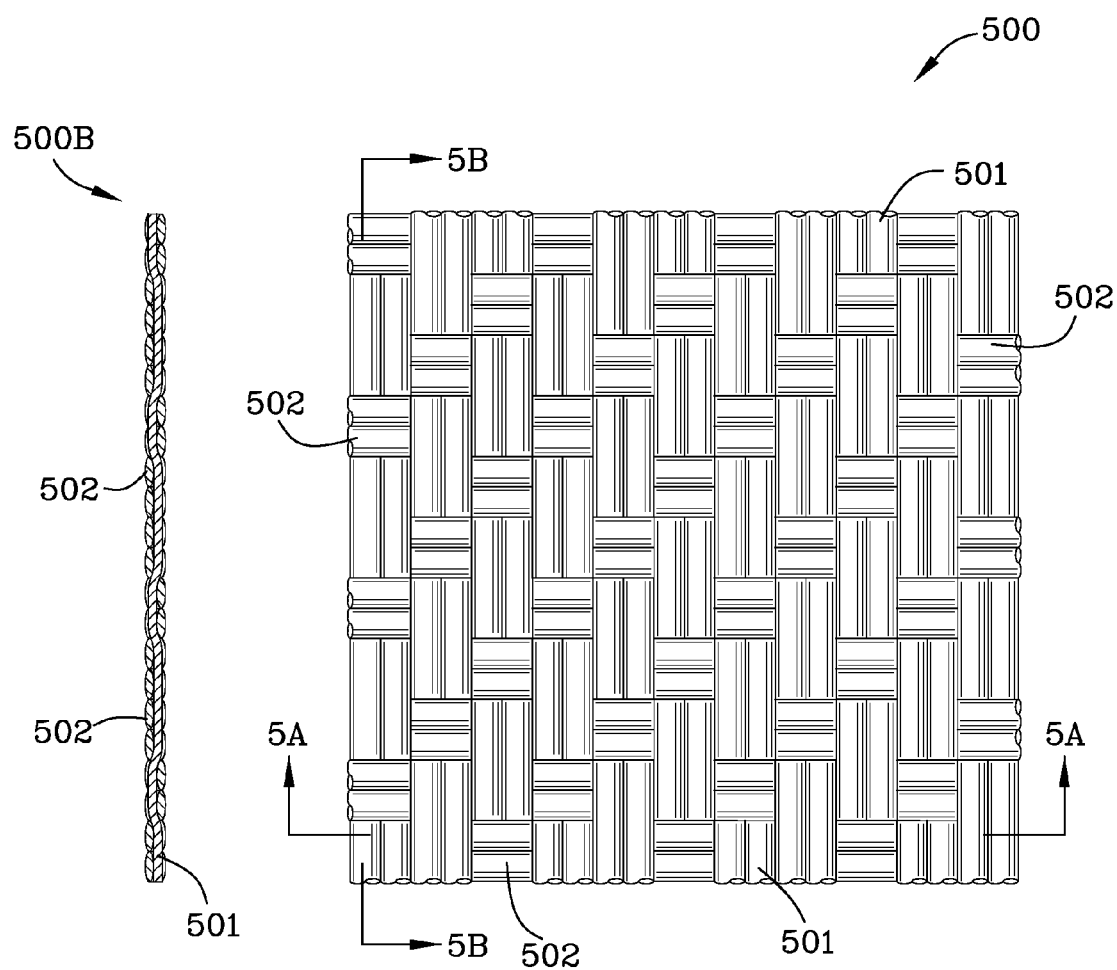
FIG. 5 is a schematic illustration of the exterior of the Vectran® yarn jacket woven in a twill weave pattern.
FIG. 5B is a cross-section of the woven yarn of FIG. 5 taken along the lines 5B-5B of FIG. 5.
Figure 5A:
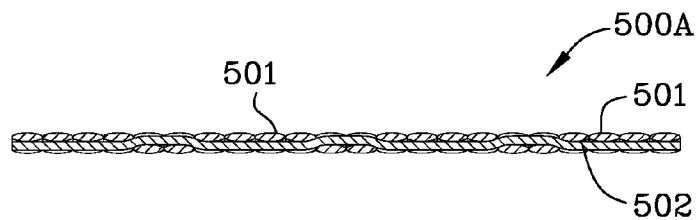
FIG. 5A is a cross-section of the woven yarn of FIG. 5 taken along the lines 5A-5A of FIG. 5.

FIG. 5 is a schematic illustration 500 of the exterior of the Vectran® yarn jacket woven in a twill weave pattern. FIG. 8 is a cross-sectional view 800 of the inner liner 710 fully inserted within a section of the outer jacket/outer liner/cover 620. The jacket for a 6 inch diameter hose is approximately 0.090 inches thick 628 measured from one side of the weave to the other. Thickness 628 is illustrated in FIG. 5A. Nine-ply weft yarn 501 is illustrated vertically and seven-ply warp yarn 502 is illustrated horizontally in FIG. 5. FIG. 5A is a cross-section 500A of the woven yarn of FIG. 5 taken along the lines 5A-5A of FIG. 5. FIGS. 5 and 5A illustrates the seven-ply warp yarn 501 arranged in a 4-2-4-2-4- . . . repeating pattern. FIG. 5B is a cross-section 500B of the woven yarn of FIG. 5 taken along the lines 5B-5B of FIG. 5. Further, FIGS. 5 and 5B illustrate the nine-ply weft yarn 502 arranged in a 4-2-4-2-4- . . . repeating pattern. The pattern 4-2-4-2-4- . . . for the seven ply warp 502 and the nine ply weft 501 yarns is preferred as the Vectran® yarn performs favorably in this pattern in that there is less bending as compared to other patterns which may be employed. Hoses employing the woven jacket have been pressure tested at 2,250 pounds per square inch. However, other weave patterns are specifically contemplated and it is intended that other patterns are covered by the appended claims. Nominally the hose described herein operates at 750 pounds per square inch. Nominally, the hose diameters are in the range of 1.5 inch to 6.0 inches The preferred yarn (flat stock) is Vectran® HT 1500 which has filament diameters of 23 microns, and 300 filament counts. A seven-ply warp yarn is made up of twisted Vectran® fibers (flat stock/yarn). A nine-ply weft yarn is made up of twisted Vectran® fibers (flat stock/yarn). The yarns are twisted 1.5 turns per inch to fabricate the seven-ply warp yarn and the nine-ply weft yarn. The seven-ply warp yarn 502 is approximately 0.060 inches in diameter and the nine-ply weft yarn is approximately 0.070 inches in diameter. Further, as illustrated herein in the drawing figures the seven-ply warp and the nine-ply weft yarns are somewhat compressed and elongated so that in cross-section they are illustrated as somewhat elliptical. It has been found that the 2-4-2-4- . . . repeating pattern of the seven-ply warp and nine-ply weft yarn is desirable as the angle of the transition of the weave pattern α as shown in FIG. 7A is very shallow. It has been found that shallow angles in the weave retain the strength of the Vectran® filaments/fibers. The angle α illustrated in FIG. 7A pertains to the seven-warp yarn 502. The angle β with respect to the nine-ply weft yarn 501 is similarly shallow and is best viewed in FIG. 8C.

It is desirable, therefore, to provide a hose using Vectran fiber. The hose includes three layers: a liner 710, a jacket 501, 502 and a cover 620. The liner 710 and cover 620 are polyurethane. The yarn used for the jacket is Vectran® which has high tensile strength and good strength retention for a wide range of temperatures. Vectran® is a registered trademark of Kuraray Co. Ltd. of Japan.

Figure 6:
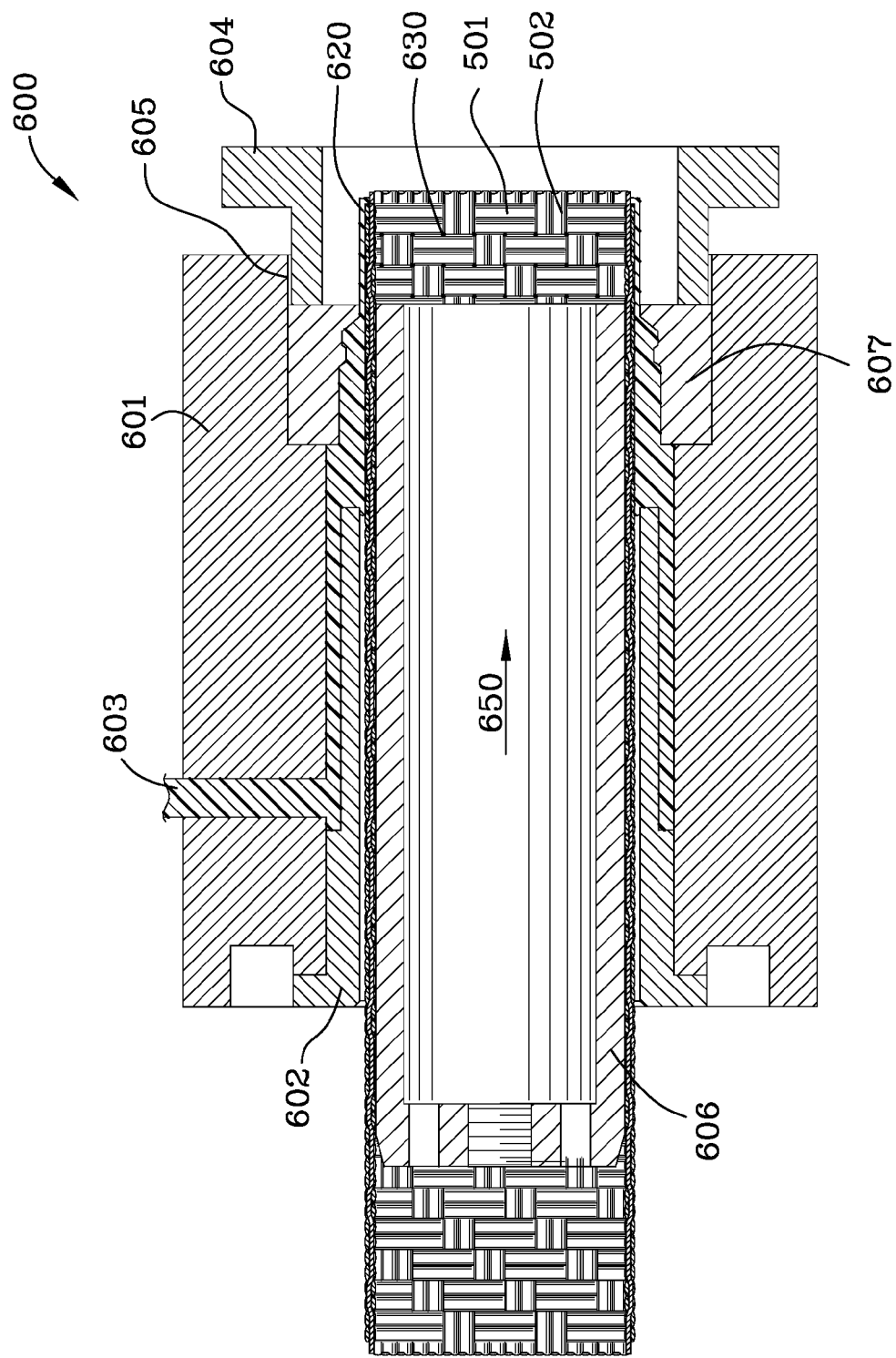
FIG. 6 is a cross-section of the woven fabric being drawn over a mandrel with polyurethane extruded onto the surface of the fabric and forming pillars therein.

FIG. 6 is a cross-section 600 of the woven jacket made up of seven-ply warp yarn 502 and nine-ply weft yarn 501 being drawn over a mandrel 606 with polyurethane 603 extruded onto the surface of the woven fabric and forming pillars 630 therein. Pillars of urethane are created by spaces or gaps occurring between the seven-ply warp yarn and the nine-ply weft yarn. The woven jacket is pulled relatively slowly over the mandrel 606 to maintain maximum strength of the yarn. If too much heat and pressure is applied to the yarn the Vectran® material does not perform as well.

Therefore, it has been found that it is best to construct a hose wherein the polyurethane is applied onto the woven jacket made of Vectran® and through the pillars 630 but not through to the interior of the woven jacket. Coating of the interior of the woven jacket is not desired as this creates a hydraulic lock causing additional tension (pressure) applied to the woven jacket which is not desired. Coating through the hose also would create additional shearing of the polyurethane and thus increase the tension (pressure) on the woven jacket as it is pulled through the mandrel.

Mandrel 606 is supported within the extruder by means not shown. The woven jacket is being drawn in the direction of arrow 650 in FIG. 6. A body 601 supports insert 602 forming a channel for heated polyurethane 603 to flow therethrough to the surface of the woven jacket 501, 502 coating polyurethane thereon. Some polyurethane extends through the pillars 630 (joints) between the warp and weft fibers. Extrusion head 607 forms a gap between a wiper portion thereof and the exterior of the woven jacket which controls the nominal thickness of 0.40 inches of polyurethane outer liner 620. Locking end piece 604 secures the extrusion head 607 against the body 601 by means of threaded interconnection 605 of locking end piece and body.

Figure 7:
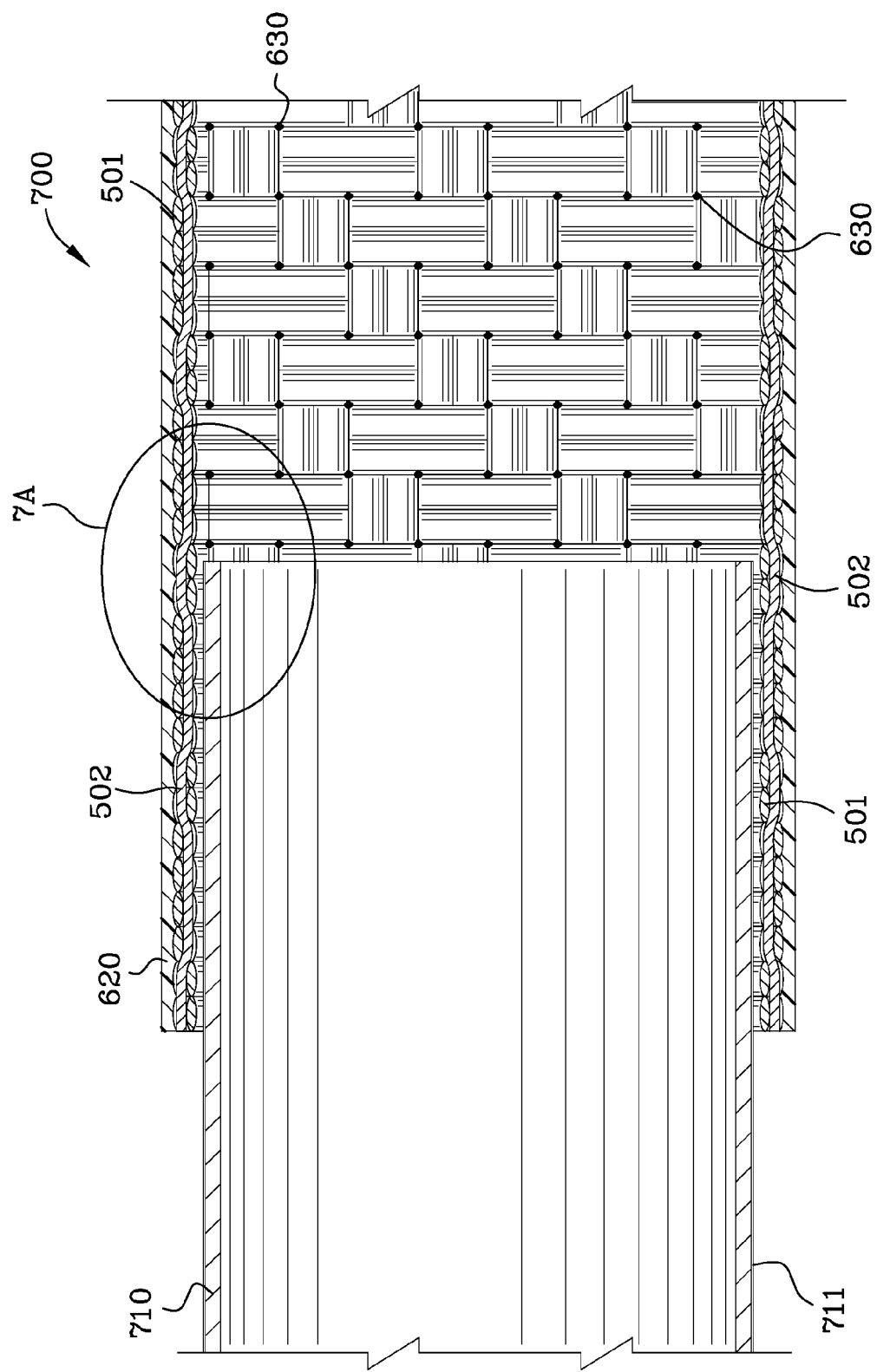
FIG. 7 is a cross-sectional view of the inner liner in the process of being drawn into the outer liner.

FIG. 7 is a cross-sectional view of the inner liner 710 with adhesive thereon 711 in the process of being drawn into the outer liner 620. FIG. 7A is an enlargement 700A of a portion of FIG. 7. FIG. 7A illustrates the slope α of the seven-ply warp yarn 502 as it is woven over two of the nine-ply weft yarns 501. Referring to FIG. 7A, one of the nine-ply warp yarns 501 includes an illustration of the individual weft yarns 730 which are twisted such that there are 1.5 turns per inch. FIG. 7B is an enlargement 700B of one ply used in the nine-ply weft yarn illustrating individual filaments 731. FIG. 8 is a cross-sectional view 800 of the inner liner 710 fully inserted within a section of the outer jacket/outer liner 620. FIG. 8A is an enlargement 800 of a portion of FIG. 8 illustrating the adhesive interengaging the woven jacket (501, 502). FIG. 7B is an enlargement of one ply used in the nine-ply weft yarn. One ply 730 of a nine-ply weft yarn is illustrated in FIG. 7A. It will be noticed that the individual plies 730 assume a shape which approximates an elliptical nine-ply weft yarn 501. In other words the individual plies may assume different positions as compared to those illustrated in FIG. 7B.

Figure 8B:
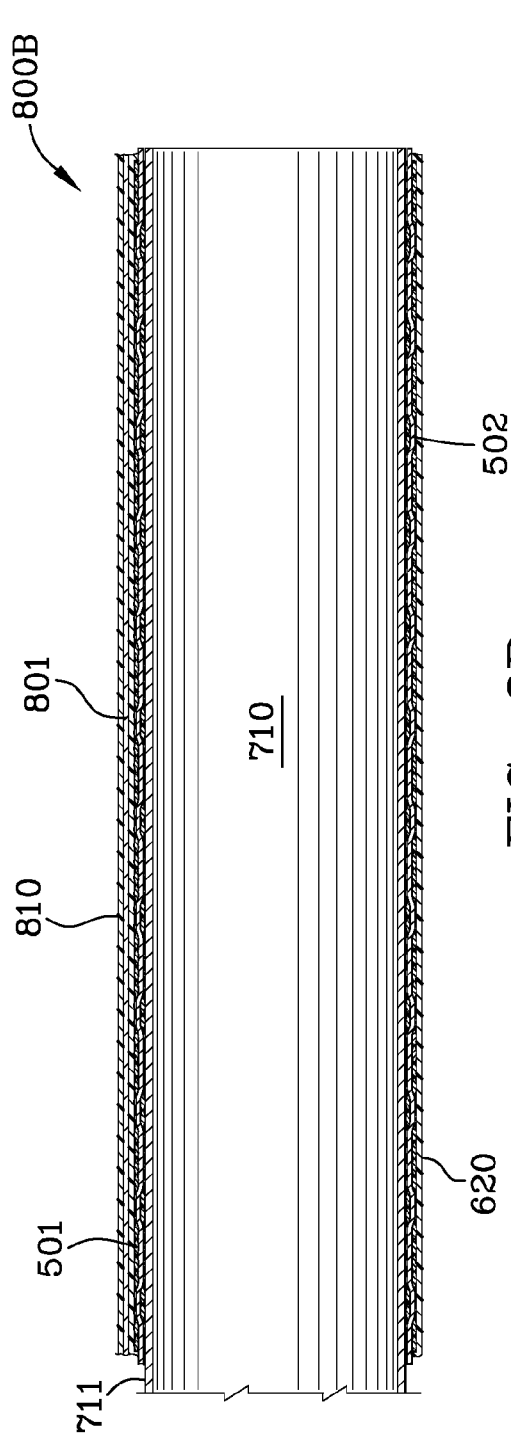
FIG. 8B is a cross-sectional view of the hose with the metallic conductive strip embedded therein.
Figure 8C:
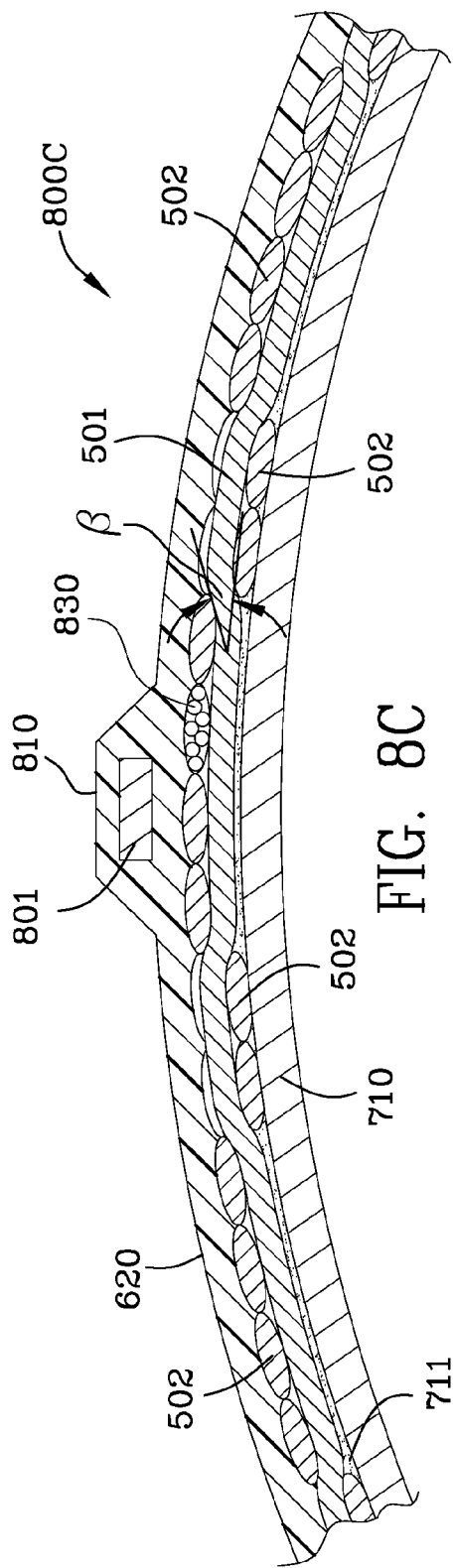
FIG. 8C is a cross-sectional view of the hose of FIG. 8B.

FIG. 8B is a cross-sectional view 800B of a hose with the metallic conductive strip 801 embedded in the outer liner 810. FIG. 8C is a cross-sectional view 800C of the hose of FIG. 8B indicating the warp 502 and weft 501 yarns as well as the conductor embedded in the outer liner 620, 810. FIG. 8C illustrates the slope β of the nine-ply weft yarn 501 as it is woven over two of the seven-ply weft yarns 502. Referring to FIG. 8C, one of the seven-ply warp yarns 502 includes an illustration of the individual warp yarns 830 which are twisted such that there are 1.5 turns per inch. The warp yarns have filaments as illustrated in FIG. 7B.

Figure 1I:
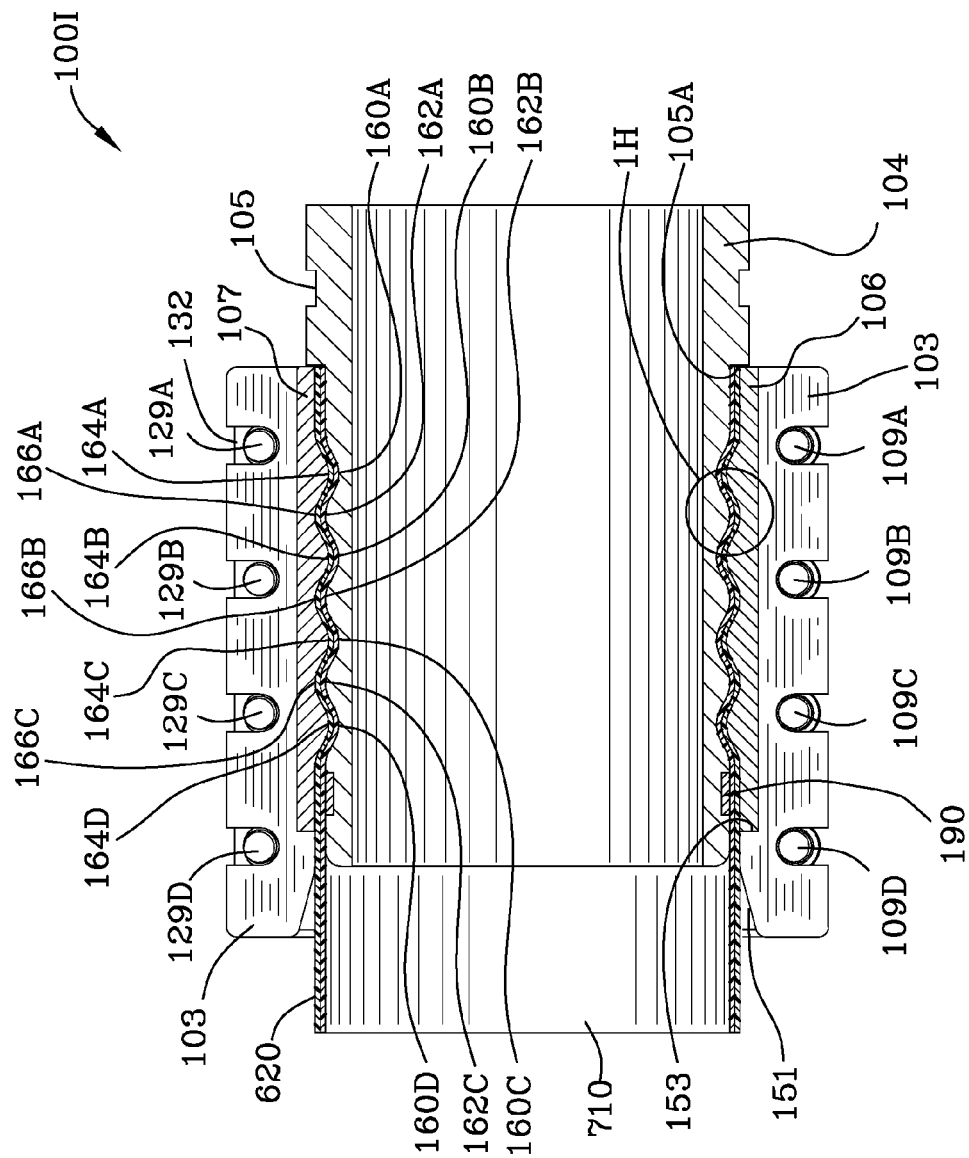
FIG. 1I is a cross-sectional view of the coupling and hose of FIG. 1 taken along the lines 1I-1I of FIG. 1.
Figure 1J:
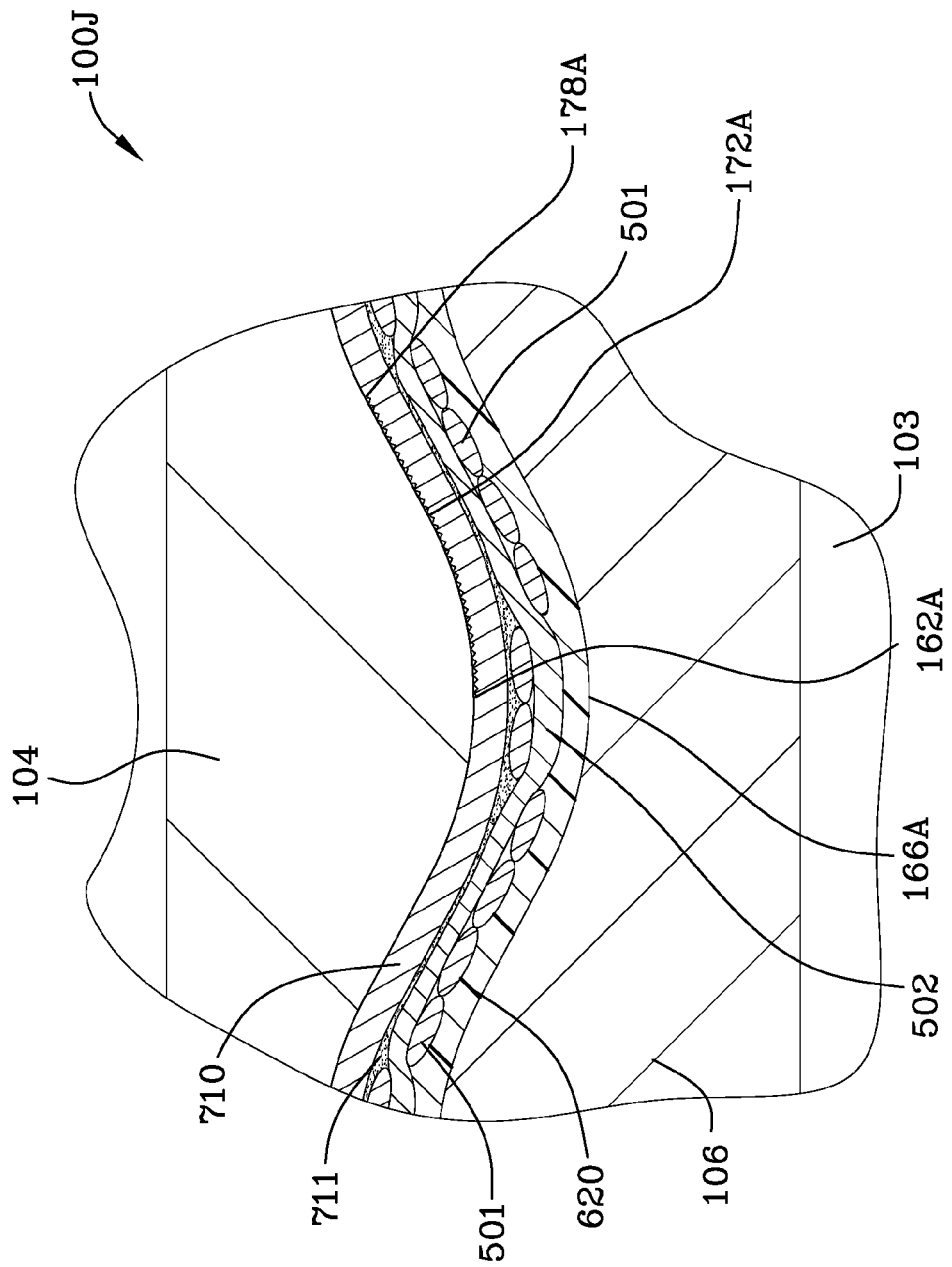
FIG. 1J is an enlargement of a portion of FIG. 1I illustrating the hose compressed between the tailpiece and one half of the sleeve.

FIG. 1I is a cross-sectional view 100I of the coupling and hose of FIG. 1 taken along the lines 1I-1I of FIG. 1. FIG. 1I illustrates the hose 710, 620 illustrated in FIGS. 8 and 8A compressed between the sleeve and the tailpiece. FIG. 1J is an enlargement 100J of a portion of FIG. 1I illustrating the hose compressed between the tailpiece and one half of the sleeve. FIG. 1J illustrates the inner polyurethane liner 710, adhesive 711, warp yarn 502 and the outer liner 620 compressed between the sleeve 106 and the tailpiece 104.

Figure 9:
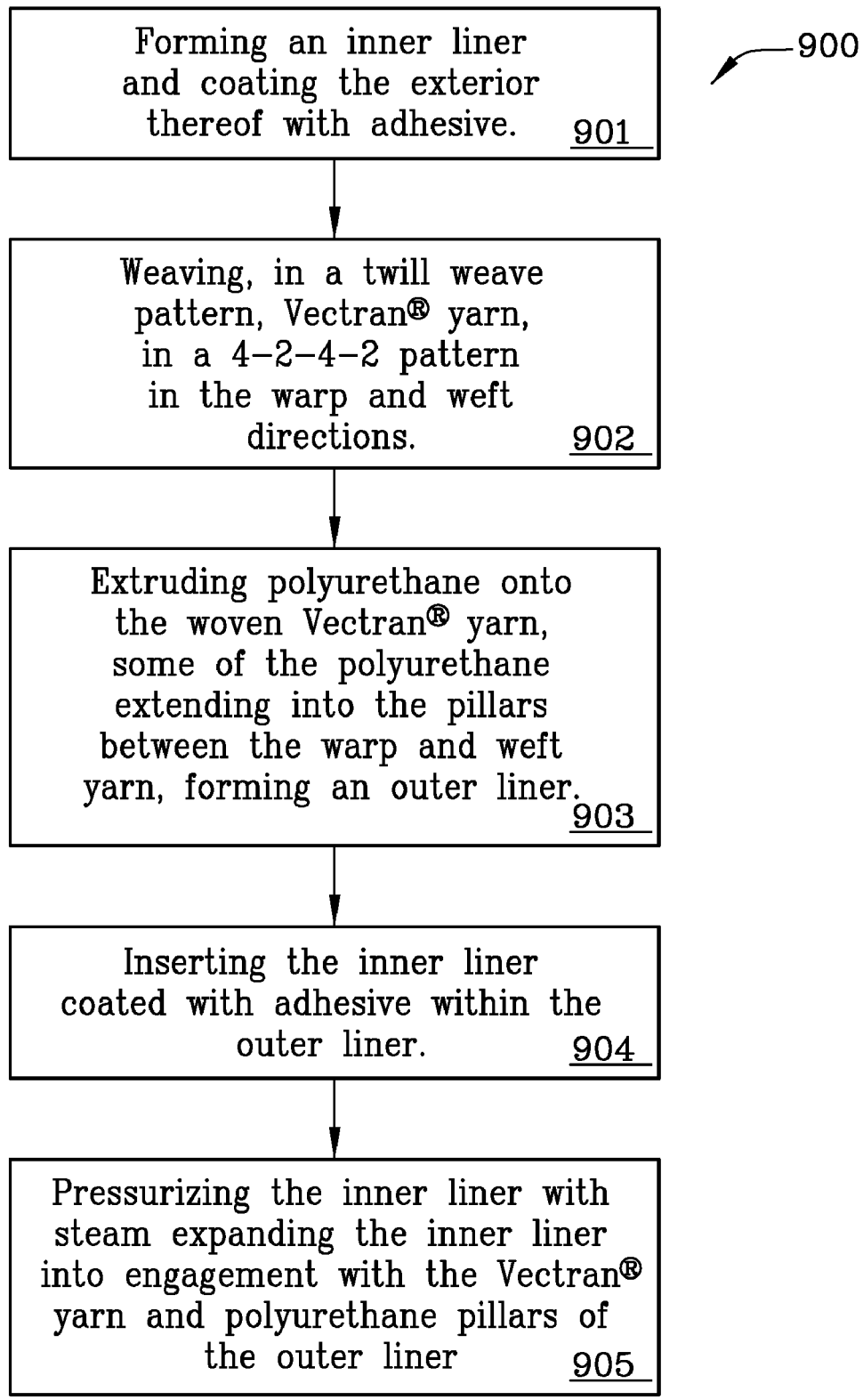
FIG. 9 is a schematic of the process steps for making the hose.

FIG. 9 is a schematic of the process steps for making the hose. 900—is a schematic of the process steps for making the hose. The steps include: twisting Vectran® yarn into seven-ply warp yarn and nine-ply weft yarn 906; forming an inner liner and coating the exterior thereof with adhesive 90 1; weaving, in a twill weave pattern, Vectran® yarn, in a 2-4-2-4-2 pattern in both the warp and the weft directions 902; extruding polyurethane onto the woven Vectran® yarn, some of the polyurethane extending into the pillars between the warp and weft yarn, forming an outer line 903; inserting the inner liner coated with adhesive within the outer liner 904; and, pressurizing the inner liner with steam expanding the inner liner into engagement with the Vectran® yarn and polyurethane pillars of the outer liner 905.

REFERENCE NUMERALS

100—a front perspective view of the coupling and hose.
100A—an exploded assembly view of the hose and coupling illustrating the hose, tailpiece and sleeve
100B—a cross-sectional view of the coupling and hose of FIG. 1 taken along the lines 1B-1B of FIG. 1
100C—a cross-sectional view of the coupling and hose of FIG. 1 illustrating the grounding wire engaging the collar
100D—a perspective view of the tailpiece illustrating the exterior contour of the tailpiece and the diamond shaped knurl thereon
100E—a front view of the tailpiece
100F—a cross-sectional view of the tailpiece taken along the lines 1F-1F of FIG. 1E
100G—an enlarged portion of FIG. 1F illustrating the diamond shaped knurl on a portion of the surface of the tailpiece
100H—an enlargement of a portion of FIG. 1B illustrating the hose sandwiched between the tailpiece and one half of the sleeve the sleeve
100I—a cross-sectional view of the coupling and hose of FIG. 1 taken along the lines 1I-1I of FIG. 1
100G—an enlargement of a portion of FIG. 1B illustrating the hose sandwiched between the tailpiece and one half of the sleeve the sleeve
101—hose
101M—grounding wire embedded in hose
102—first, top collar half
103—bottom collar half
104—tailpiece, coupling end
104H—tailpiece, hose end
105—mating groove for coupling end connection to another fitting, pump or truck
105A—shoulder which is abutted by hose material
106—first sleeve half
106A—set of six fingers of first sleeve half 106
106I—set of five fingers of first sleeve half 106
107—second sleeve half
107I—set of five fingers of second sleeve half 107
107A—set of six fingers of second sleeve 107 (interdigitated finger)
108—gap in collar
109A—threaded bolt
109B—threaded bolt
109C—threaded bolt
109D—threaded bolt
110—encased grounding wire
111A—bolt head well
111B—bolt head well
111C—bolt head well
111D—bolt head well
112—threaded pivot rod
113-J—shaped pivot rod seat in first, top collar
121A—passageway for bolt in second, bottom collar
121B—passageway for bolt in second, bottom collar
121C—passageway for bolt in second, bottom collar
121D—passageway for bolt in second, bottom collar
123-J—shaped pivot rod seat
129A—threaded bolt
129B—threaded bolt
129C—threaded bolt
129D—threaded bolt
131A—passageway for bolt in first, top collar
131B—passageway for bolt in first, top collar
131C—passageway for bolt in first, top collar
131D—passageway for bolt in first, top collar
132—threaded pivot rod
150—end of collar
151—sloped hose inlet of collar
152—land in inlet of collar
153—shoulder of collar
160A—valley (low point) of the sinusoidal waveform of the exterior of the tailpiece
160B—valley (low point) of the sinusoidal waveform of the exterior of the tailpiece
160C—valley (low point) of the sinusoidal waveform of the exterior of the tailpiece
160D—valley (low point) of the sinusoidal waveform of the exterior of the tailpiece
162A—peak (high point) of the sinusoidal waveform of the exterior of the tailpiece
162B—peak (high point) of the sinusoidal waveform of the exterior of the tailpiece
162C—peak (high point) of the sinusoidal waveform of the exterior of the tailpiece
162D—peak (high point) of the sinusoidal waveform of the exterior of the tailpiece
164A—peak (high point) of the sinusoidal waveform of the interior of second sleeve
164B—peak (high point) of the sinusoidal waveform of the interior of second sleeve
164C—peak (high point) of the sinusoidal waveform of the interior of second sleeve
164D—peak (high point) of the sinusoidal waveform of the interior of second sleeve
166A—valley (low point) of the sinusoidal waveform of the interior of the second sleeve tailpiece
166B—valley (low point) of the sinusoidal waveform of the interior of the second sleeve tailpiece
166C—valley (low point) of the sinusoidal waveform of the interior of the second sleeve tailpiece
172A—diamond shaped knurled portion of the sinusoidal waveform on the exterior of the tailpiece
172B—diamond shaped knurled portion of the sinusoidal waveform on the exterior of the tailpiece
172C—diamond shaped knurled portion of the sinusoidal waveform on the exterior of the tailpiece
172D—diamond shaped knurled portion of the sinusoidal waveform on the exterior of the tailpiece
178A—starting place of the diamond shaped knurled portion of the sinusoidal waveform on the exterior of the tailpiece
178B—starting place of the diamond shaped knurled portion of the sinusoidal waveform on the exterior of the tailpiece
178C—starting place of the diamond shaped knurled portion of the sinusoidal waveform on the exterior of the tailpiece 178D—starting place of the diamond shaped knurled portion of the sinusoidal waveform on the exterior of the tailpiece
190—recess for seal 190
190R—recess for seal 190
199P—zig-zag parting line between interdigitated fingers of each sleeve
200—an exploded view of the hose positioned to be slid over the tail piece
201—arrow indicating the direction of movement of the hose
200A—an exploded view of the hose residing over the coupling 104
200B—a cross-sectional view of one-half of the sleeve taken along the lines 2B-2B of FIG. 2A
200C—hose positioned to be slid over a tailpiece which is not knurled
300—a perspective view of the two halves of the collar
300A—a cross-sectional view of the two halves of the collar taken along the lines 3A-3A of FIG. 3
300B—a top view of the collar
400—schematic of process steps for using the coupling
401—sliding a hose over the exterior of a tailpiece
402—positioning first and second sleeves into engagement with the outside of the hose, each sleeve having interdigitated fingers for interengagement with the sleeve, and each sleeve includes undulating interior surfaces
403—positioning first and second collar halves into engagement with first and second sleeves such that the joint between the first and second collars is rotationally offset from the interengagment of the interdigitated fingers of the sleeves
404—clamping the first and second sleeves to the hose
405—torqueing, uniformly, the collars to each other urging them into forceful engagement with the sleeves; and, compressing the hose between the undulating exterior surface of the tailpiece and the undulating interior surface of the sleeves
500—is a schematic illustration of exterior of the woven jacket woven in a twill weave pattern using Vectran® yarn
501—weft fiber
502—warp fiber
500A—is a cross-section of the woven yarn taken along the lines 5A-5A
500B—is a cross-section of the woven yarn of FIG. 5 taken along the lines 5B-5B
600—is a cross-section of the woven fabric being drawn over a mandrel with polyurethane extruded onto the surface of the fabric and forming pillars therein
601—body
602—body insert
603—heated polyurethane
604—locking end piece
605—threaded interconnection of locking end piece and body
606—mandrel
607—extrusion head
620—outer liner
630—pillars
650—directional arrow
700—is a cross-sectional view of the inner liner in the process of being drawn into the outer liner
700A—is an enlargement of a portion of FIG. 7
700B—an enlargement of one ply used in the nine-ply weft yarn
710—polyurethane outer liner
711—adhesive coating
730—one ply of a nine-ply weft yarn
731—filaments of one ply
800—is a cross-sectional view of the inner liner fully inserted within a section of the outer jacket/outer liner
800A—enlargement of a portion of FIG. 8
800B—cross-sectional view of hose with grounding conductor encapsulated in outer cover
800C—cross-sectional view of the cover of FIG. 8B
801—electrical conductor
810—encapsulation of electrical conductor
830—one ply of a seven-ply warp yarn
900—is a schematic of the process steps for making the hose
901—forming an inner liner and coating the exterior thereof with adhesive
902—weaving, in a twill weave pattern, Vectran® yarn, in a 2-4-2-4-2 pattern in both the warp and the weft directions
903—extruding polyurethane onto the woven vectran yarn, some of the polyurethane extending into the pillars between the warp and weft yarn, forming an outer liner
904—inserting the inner liner coated with adhesive within the outer liner
905—pressurizing the inner liner with steam expanding the inner liner into engagement with the Vectran® yarn and polyurethane pillars of the outer liner
906—twisting Vectran® yarn into seven-ply warp yarn and nine-ply weft yarn
α—angle of warp yarn
β—angle of weft yarn Those skilled in the art will realize that the invention has been set forth by way of example only and that changes may be made to the examples shown herein without departing from the spirit and the scope of the claims which have been appended hereto.

The invention claimed is:

1. A hose, comprising:
an outer jacket;
said outer jacket includes warp and weft yarns, said warp and weft yarns made of liquid crystal polymer fibers;
said outer jacket includes an interior and an exterior;
said warp and weft yarns of said outer jacket are arranged in a twill weave;
said weave includes spaces between said warp and weft yarns;
an outer polyurethane liner extruded onto and into said outer jacket, said extrusion into said outer jacket forming polyurethane pillars residing in said spaces between said warp and weft yarns but not extending into said interior of said outer jacket;
polyurethane inner liner, said polyurethane inner liner being cylindrically shaped and having an inner surface and an outer surface;
an adhesive;
said adhesive interposed between said outer surface of said polyurethane inner lining and said warp yarns, said weft yarns and said pillars of said outer jacket adhering said polyurethane inner liner to said warp yarns, said weft yarns and said polyurethane pillars of said outer jacket.

2. A hose as claimed in claim 1, wherein said warp yarns and weft yarns of said outer jacket are substantially elliptically-shaped in cross-section.

3. A hose as claimed in claim 2, wherein said substantially elliptically-shaped warp yarns engage said substantially elliptically-shaped weft yarns, said warp yarns being substantially linear in cross-section and not substantially bent due to said substantially elliptical shape of said warp yarns and said weft yarns.

4. A hose as claimed in claim 1 wherein said weave of said warp yarns and said weft yarns formed in said twill weave is in a repeating 2-4-2-4 pattern.

5. A hose as claimed in claim 4 wherein said pillars are nonuniform and do not extend through said jacket in a regular pattern.

6. A hose as claimed in claim 5 wherein said warp yarns are seven-ply warp yarns and said weft yarns are nine-ply weft yarns.

7. A hose as claimed in claim 6 wherein said warp and weft yarns are twisted 1.5 turns per inch.

8. A hose as claimed in claim 7 further comprising a conductor embedded in said outer polyurethane liner.

9. A hose, comprising:
an outer jacket;
said outer jacket includes warp yarns and weft yarns, said warp and weft yarns made of liquid crystal polymer fibers, said warp and weft yarns of said outer jacket arranged in a twill weave having a repeating 2-4-2-4 pattern, and, said weave includes spaces between said warp and weft yarns;
an outer polyurethane liner extruded onto and into said outer jacket, said outer polyurethane liner extending through said twill weave having said repeating 2-4-2-4 pattern forming polyurethane pillars; and,
said polyurethane pillars are nonuniform and do not extend through said jacket in a regular pattern.

10. A hose as claimed in claim 9 further comprising a polyurethane inner liner and said inner liner includes an exterior coated with adhesive.

11. A hose as claimed in claim 10 wherein said adhesive of said inner liner engages said warp yarns, weft yarns and pillars of said outer jacket.

12. A hose as claimed in claim 11 further comprising a conductor embedded in said outer polyurethane liner.

13. A hose as claimed in claim 9 wherein said warp yarns are seven-ply warp yarns and said weft yarns are nine-ply weft yarns.

14. A hose as claimed in claim 9, wherein said warp yarns and weft yarns of said outer jacket are substantially elliptically-shaped in cross-section.

15. A hose as claimed in claim 14, wherein said substantially elliptically-shaped warp yarns engage said substantially elliptically-shaped weft yarns, said warp yarns being substantially linear in cross-section and not substantially bent due to said substantially elliptical shape of said warp yarns and said weft yarns thus maintaining strength of said outer jacket.

* * * * *

UNITED STATES PATENT AND TRADEMARK OFFICE
CERTIFICATE OF CORRECTION

PATENT NO. : 8,327,887 B2
APPLICATION NO. : 12/323624
DATED : December 11, 2012
INVENTOR(S) : Mark Lockhart et al.

It is certified that error appears in the above-identified patent and that said Letters Patent is hereby corrected as shown below:

Col. 18, line 5, claim 11, insert -- said -- before "weft"; and,

Col. 18, line 6, claim 11, insert -- said -- before "pillars".

Signed and Sealed this
Nineteenth Day of March, 2013

Teresa Stanek Rea
*Acting Director of the United States Patent and Trademark Office*